US012004492B2

(12) United States Patent
Anderson et al.

(10) Patent No.: US 12,004,492 B2
(45) Date of Patent: Jun. 11, 2024

(54) NETWORKED WEIGHT SCALE FOR SMART ORDERING

(71) Applicant: Radio Systems Corporation, Knoxville, TN (US)

(72) Inventors: Ryan P. Anderson, Knoxville, TN (US); Jonathan W. Huber, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 545 days.

(21) Appl. No.: 17/167,556

(22) Filed: Feb. 4, 2021

(65) Prior Publication Data

US 2022/0240486 A1 Aug. 4, 2022

(51) Int. Cl.
| | |
|---|---|
| *A01K 5/02* | (2006.01) |
| *G01G 19/00* | (2006.01) |
| *G01G 23/00* | (2006.01) |
| *G06Q 10/08* | (2024.01) |
| *G06Q 10/087* | (2023.01) |

(52) U.S. Cl.
CPC .......... *A01K 5/0291* (2013.01); *A01K 5/0283* (2013.01); *G06Q 10/087* (2013.01); *G01G 19/00* (2013.01); *G01G 23/00* (2013.01)

(58) Field of Classification Search
CPC ........ G01G 19/00; G01G 19/52; G01G 23/00; A01K 5/0291; A01K 5/0283; G06Q 10/087
See application file for complete search history.

(56) References Cited

U.S. PATENT DOCUMENTS

| | | | | |
|---|---|---|---|---|
| 5,954,576 | A * | 9/1999 | Coulter | G07F 9/08 |
| | | | | 177/25.17 |
| 2011/0303468 | A1* | 12/2011 | Ting | G01G 19/4144 |
| | | | | 177/25.15 |
| 2012/0299731 | A1* | 11/2012 | Triener | G16Z 99/00 |
| | | | | 702/19 |
| 2014/0246255 | A1* | 9/2014 | Semeniuta | G01G 19/40 |
| | | | | 177/25.14 |
| 2015/0181837 | A1* | 7/2015 | Cornwell | A01K 5/0291 |
| | | | | 119/51.02 |
| 2016/0000036 | A1* | 1/2016 | Cornwell, Jr. | A01K 5/0291 |
| | | | | 119/51.11 |
| 2016/0029592 | A1* | 2/2016 | Springer | G08C 17/02 |
| | | | | 119/51.11 |

* cited by examiner

*Primary Examiner* — Randy W Gibson
(74) *Attorney, Agent, or Firm* — Baker, Donelson, Bearman, Caldwell & Berkowitz, PC

(57) ABSTRACT

A system is described including a scale device for measuring weight of a food container, wherein one or more applications run on at least one processor of the scale device and are configured to detect weight of the food container and its contents using the scale device. The one of more applications are configured to detect a first weight measurement of the food container, wherein the first weight measurement includes weight of the food container and a first amount of food, to detect a second weight measurement of the food container, wherein the second weight measurement includes the weight of the food container, the first amount of food, and a second amount of food, wherein the second weight measurement is an updated weight measurement of the food container, to subsequently log weight measurements of the food container at time intervals, and to intermittently adjust and monitor the updated weight measurement.

29 Claims, 26 Drawing Sheets

NETWORKED WEIGHT SCALE FOR SMART ORDERING

CROSS REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

FIELD OF THE INVENTION

The present disclosure relates to the field of animal feeding devices.

TECHNOLOGY IN THE FIELD OF THE INVENTION

The disclosure set forth herein relates to systems and methods for monitoring an amount of food in an animal feeding device.

BRIEF DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

FIG. 2A is a side view of the conveyor system, with a side wall removed to expose the conveyor belt. A pair of pulleys is seen used for supporting and for turning the conveyor. A mechanical agitator is also visible.

FIG. 2B is a perspective view of the conveyor system of FIG. 2A, with both side walls intact. The conveyor belt includes a series of compartments for holding defined volumes of dry pet food.

FIG. 2C is another perspective view of the conveyor system of FIG. 2B, but shown from a side opposite that of FIG. 2A. No food is in the compartments of the conveyor belt.

FIG. 2D is still another perspective view of the conveyor system of FIG. 2B, but with components shown in exploded-apart relation.

In FIG. 7A, a feeding schedule is shown on the display.
In FIG. 7B, a real time status report concerning feeding is shown on the display.

In FIG. 8A, a real time status report concerning feeding is shown on the display, indicating the feeding bowl as full. In FIG. 8B, a real time status report concerning feeding is shown on the display, indicating that a pet has approached the feeding bowl.

In FIG. 9A, a new feeding schedule is shown on the display, showing a timed feeding. In FIG. 9B, a real time status report concerning feeding is shown on the display, indicating that food has been dispensed. In FIG. 9C, a real time status report concerning feeding is shown on the display, indicating that the feeding bowl has been emptied.

In FIG. 10A, a new feeding schedule is shown. In FIG. 10B, a real time status report concerning feeding is shown, indicating that the pet has received a treat.

DETAILED DESCRIPTION OF CERTAIN EMBODIMENTS

Definitions

For purposes of the present disclosure, it is noted that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

As used herein, the term "pellet" means a substantially dry, granular piece of food, of any shape, that may be consumed by a canine or feline or other similar household pet. The term "pellet" includes semi-moist kibbles.

DESCRIPTION OF SELECTED SPECIFIC EMBODIMENTS

Figure 1A:
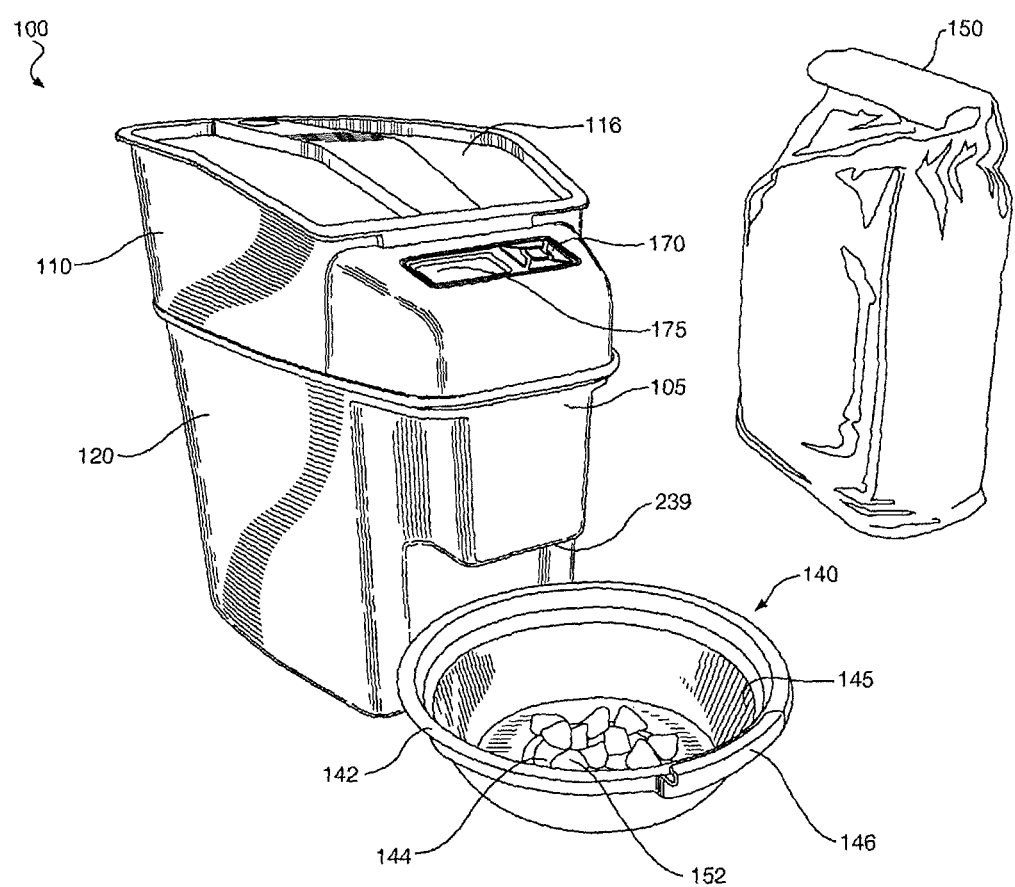
FIG. 1A is a perspective view of an animal feeding system of the present invention, in one embodiment. The feeding system includes a container for holding dry pet food, and a processor for controlling how food is dispensed into a bowl in response to programming.

FIG. 1A is a perspective view of an animal feeding system 100 of the present invention, in one embodiment. The feeding system 100 is shown as an integral unit. The feeding system 100 generally includes a container 110 for holding dry pet food, and a housing 105 for holding internal components.

The container 110 removably resides on top of the housing 105. The container 110 may be a transparent or translucent body having a substantially hollow interior. (The interior is shown at 115 in FIG. 1B.) The interior 115 is dimensioned to receive and hold a dry, pelletized pet food. Preferably, the container 110 is fabricated from a lightweight material such as a polycarbonate. Ideally, the container 110 is at least partially supported by the housing 105.

FIG. 1A also shows an illustrative bag of pet food at 150. The bag 150, of course, is not part of the system 100; however, the bag 150 is shown to demonstrate a source for pelletized food (seen in a bowl 140 at 152) that is placed into the container 110. The food may be, for example, dog food.

The animal feeding system 100 of FIG. 1A also shows a feeding bowl 140. The illustrative feeding bowl 140 includes an upper rim 142 and a supporting base 144. The bowl 140 defines an open container 145 for receiving pellets of the dry pet food (seen at 152 in FIG. 1C). The bowl 140 is positioned to gravitationally receive the pet food from a conveyor system (seen at 230 in FIGS. 2A through 2D) that resides and operates within the housing 105.

Figure 1B:
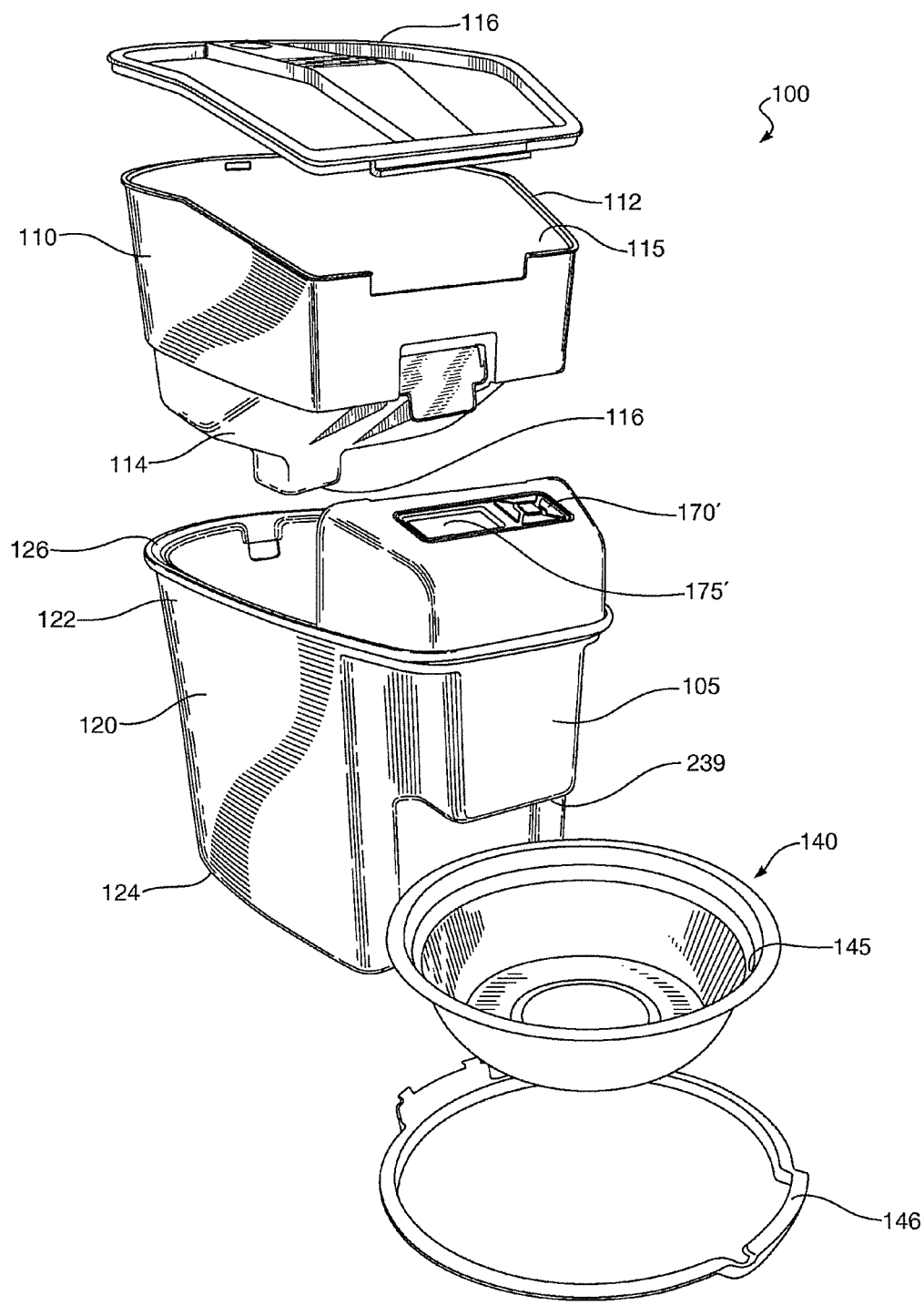
FIG. 1B is another perspective view of the animal feeding system of FIG. 1A, but showing certain components in exploded-apart relation. These components include, for example, the container, a housing and the bowl.

FIG. 1B is another perspective view of the animal feeding system 100 of FIG. 1A. In FIG. 1B, certain parts of the system 100 are shown in exploded apart relation. These components include the container 110, the housing 105 and the bowl 140. A bracket 146 for supporting the bowl 140 is also shown. Of interest, the container 110 includes an upper end 112 for receiving the lid 116, and a lower end 114. The lower end 114 of the container 110 has a funneled (or frusto-conical) opening 116 through which dog feed gravitationally travels.

Figure 1C:
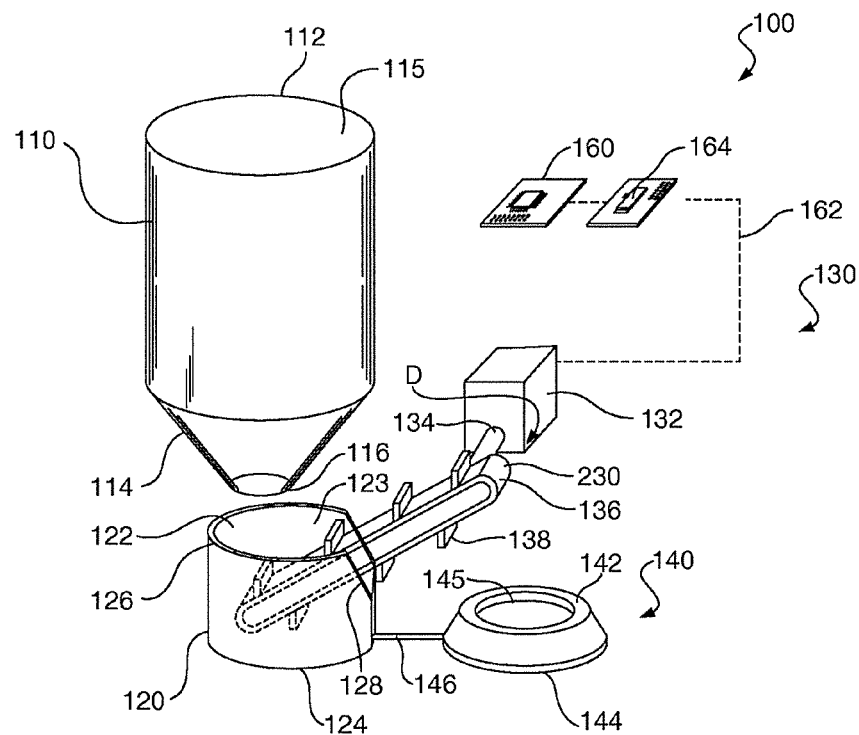
FIG. 1C is another perspective view of the animal feeding system of FIG. 1A in a modified embodiment. Here, the housing has been removed to expose a conveyor system and a drive motor. The system includes a micro-processor that is in electrical communication with a separate user control.

FIG. 1C is another perspective view of the animal feeding system 100 of FIG. 1A, in a modified embodiment. In this view, the housing 105 has been removed to expose a conveyor belt 230. The conveyor belt 230 is broken up into compartments (shown at 235 in FIG. 2B), and is cycled by a drive motor 130 that is operated by a controller. The controller is preferably a micro-processor 160, which in turn is in wired electrical communication with a separate user control (seen in FIG. 1D at 170). It is understood that the controller 160 may operate through hardware, firmware, software, or some combination thereof.

FIG. 1C also provides a perspective view of the container 110. As shown, the container 110 has a top end 112 and a lower end 114. The lower end 114 has an angled surface to facilitate gravitational movement of the pet food. A bottom portion of the lower end 114 includes an opening 116 for delivering the dry pet food 152 (shown in FIG. 1A) from the angled surface.

The pet food is gravitationally dispensed from the container 110, through the opening 116, and into a receptacle 120. In the illustrative arrangement of FIG. 1C, the receptacle 120 is a cylindrical body having an open top end 122 and a closed bottom end 124. Preferably, the open top end 122 defines a lip 126 fabricated from an elastomeric or plastic material for receiving and supporting the container 110.

In the arrangement of FIG. 1C, the receptacle 120 is shown as an independent body. The receptacle 120 includes an open wall portion 128. The open wall portion 128 is dimensioned to accommodate the conveyor belt 230. In a more preferred embodiment, and as shown in FIG. 1A, the receptacle 120 is integral to the housing 105 and forms a catch basin below the lower end 114 of the container 110 for catching the pet food.

The conveyor system 200 is configured to move pellets of pet food according to timed cycles. To do this, the conveyor system 200 works in conjunction with the drive motor 130. The motor 130 is an electric motor that resides within a suitable housing 132. Preferably, the housing 132 is fabricated from a durable, water resistant material such as metal or plastic. The motor 130 may be battery operated, but may alternatively operate under line power (electrical cord not shown). The motor 130 may have an external on/off switch, but alternatively is controlled through a digital, wireless control unit.

When activated, the drive motor 130 turns a drive shaft 134. The drive shaft 134, in turn, rotates a conveyor shaft (shown at 232 in FIG. 2B) and connected drive pulley (shown at 234 in FIG. 2B). Rotation of the conveyor shaft 232 is indicated in FIG. 2B at Arrow "D." The mechanical interface between the drive shaft 132 and the conveyor shaft 232 may be by means of a gear. Turning of the conveyor shaft 232 causes the conveyor belt 230 to be actuated. In this way, the conveyor belt 230 is rotated by the electric motor 130 to pick up volumes of the dry pet food from the receptacle 120.

A user control unit is shown in FIG. 1A at 170'. This represents a control unit that is integral to the housing 105. The control unit 170' preferably includes an LCD display 175'. As an alternative, or in addition, a remote user control unit may be employed. An example in FIG. 1D.

Figure 1D:
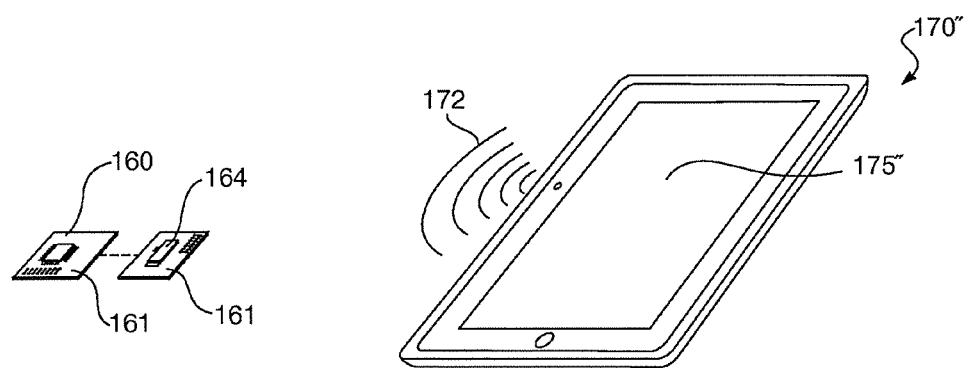
FIG. 1D is an enlarged view of a micro-processor from the animal feeding system of FIG. 1C. The micro-processor is in wireless electrical communication with a separate remote control in the form of a portable digital assistant.

FIG. 1D provides an enlarged schematic view of the micro-processor 160 from the animal feeding system 100 of FIG. 1A. The micro-processor 160 resides on a printed circuit board 161. The micro-processor 160 is in wireless electrical communication with a control unit 170" by means of an associated receiver (or transceiver) 164 The control unit 170" defines a micro-processor and a transmitter (or transceiver), and enables the user to program and remotely control feeding cycles and options for the feeding system 100.

Food delivery instructions are delivered by the user to the system 100 using wireless signals 172. The control unit 170" includes a display 175". The display 175" ideally allows for a touch-screen user interface. Preferably, the control unit 170" represents a so-called tablet that communicates with the transceiver 164 associated with the micro-processor 160 through a short-range wireless technology for exchanging data between fixed and mobile devices such as Bluetooth®, IR, Zigbee, WiFi, a telecommunications network, or other protocol. Alternatively, the control unit 170" may be a general purpose computer that communicates with the transceiver 164 associated with the micro-processor 160 through a telecommunications network. Alternatively still, the control unit 170" may be a dedicated remote control that operates in proximity to the system 100 through the use of IR signals.

As noted, the feeding system 100 also includes a feeding bowl 140. The bowl may be fabricated from any material that is easily cleaned such as stainless steel, plastic, ceramic or even glass. The illustrative feeding bowl 140 includes an upper rim 142 and a supporting base 144. The bowl 140 defines an open container 145 for receiving the pellets 152 of dry pet food. The bowl 140 is positioned to gravitationally receive the pet food from the conveyor belt 230 as the conveyor belt 230 is rotated by the drive shaft 132 in accordance with programming instructions.

In the arrangement of FIG. 1C, the bowl 140 is spaced-apart from the receptacle 120 and held in proper position by a bar 146 or other support means. The bar 146 prevents the container 145 from shifting during feeding, causing the conveyor belt 230 to "miss" the bowl 140 during dispensing. Alternatively, and as shown in FIG. 1B, the bowl 140 is an independent container 145 that may be freely removed for cleaning.

FIGS. 2A through 2D provide enlarged views of the conveyor system 200 of the animal feeding system of FIGS. 1A and 1C.

Figure 2A:
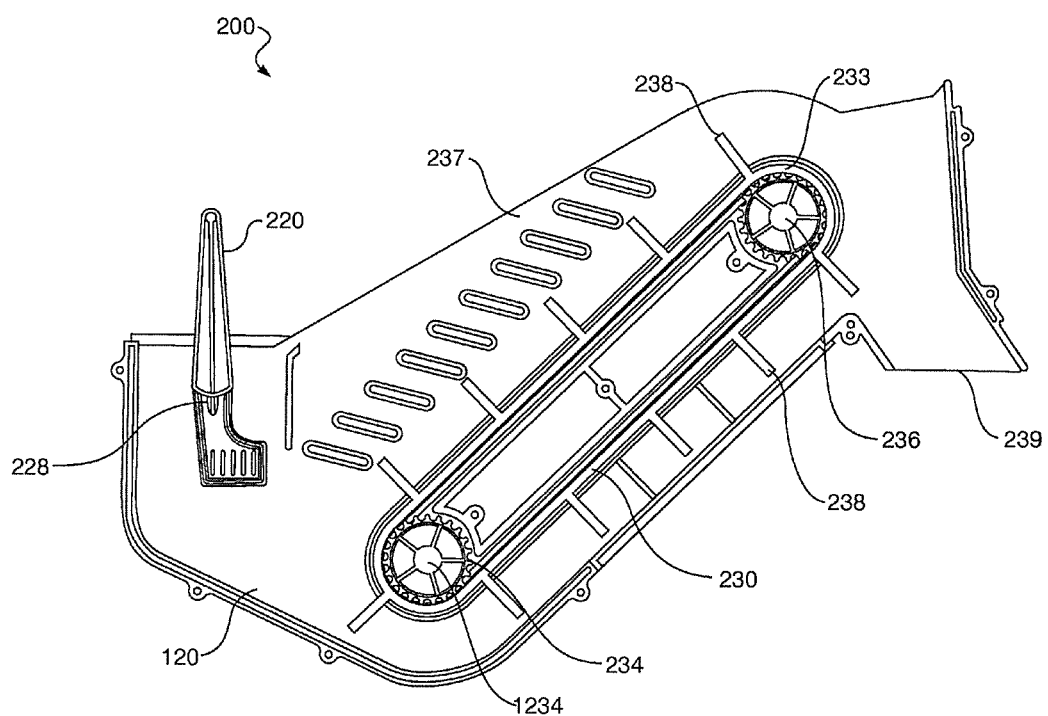
FIGS. 2A through 2D provide views of components of a conveyor system to be used in the animal feeding system of FIG. 1A. The conveyor system includes a compartmentalized conveyor belt.
Figure 2B:
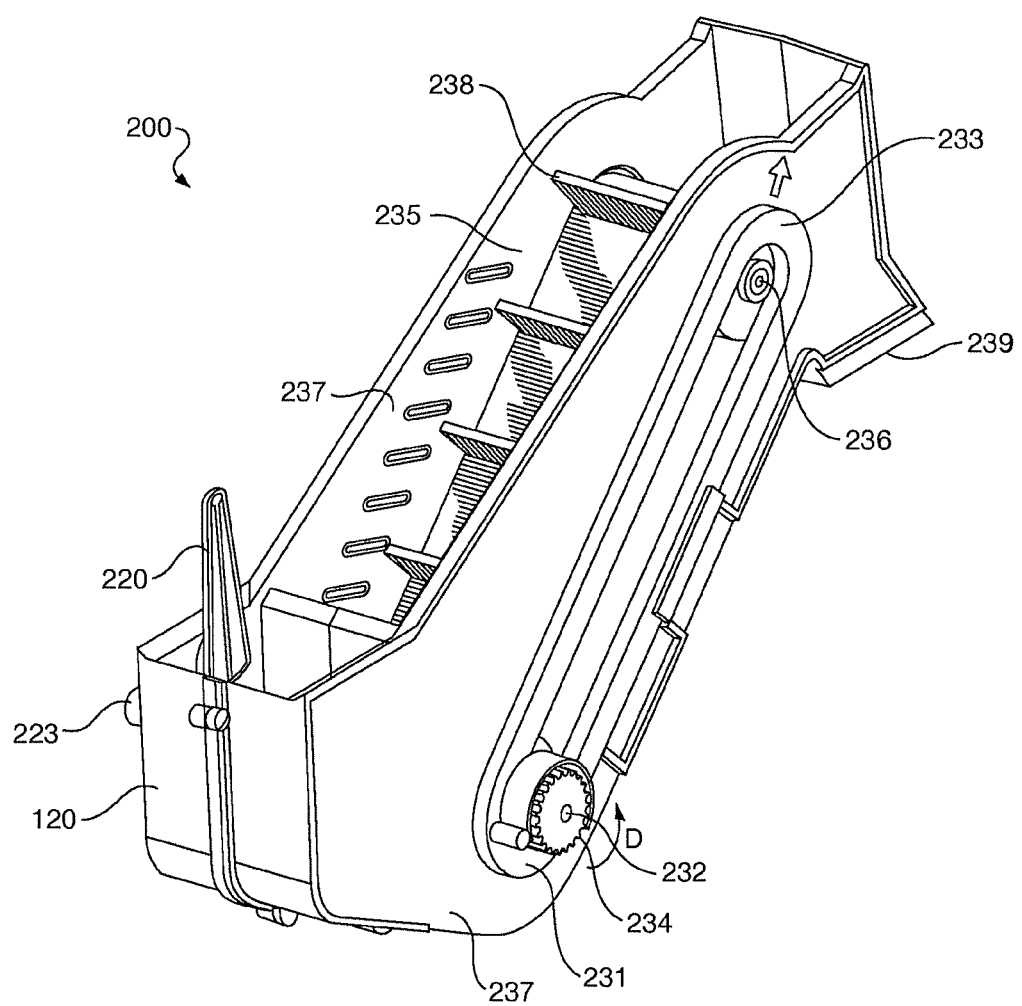

First, FIG. 2A provides a side view of the conveyor belt 230. One of the side walls 237 has been removed to expose the conveyor belt 230 for illustration. FIG. 2B is a perspective view of the conveyor belt 230 of FIG. 2A, with both side walls 237 intact. From FIG. 2B it can be seen that the conveyor belt 230 includes a series of compartments 235 for holding defined volumes of dry pet food. The walls 237 help to define the compartments 235.

Figure 2C:
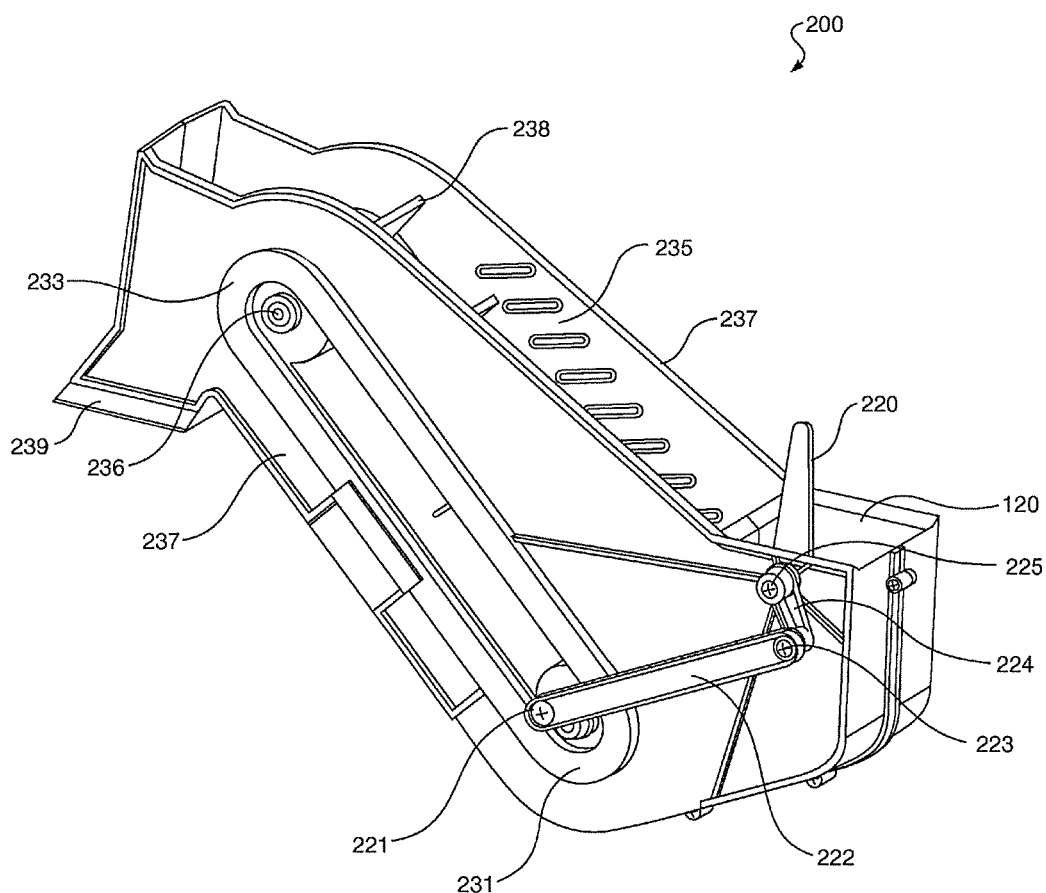
Figure 2D:
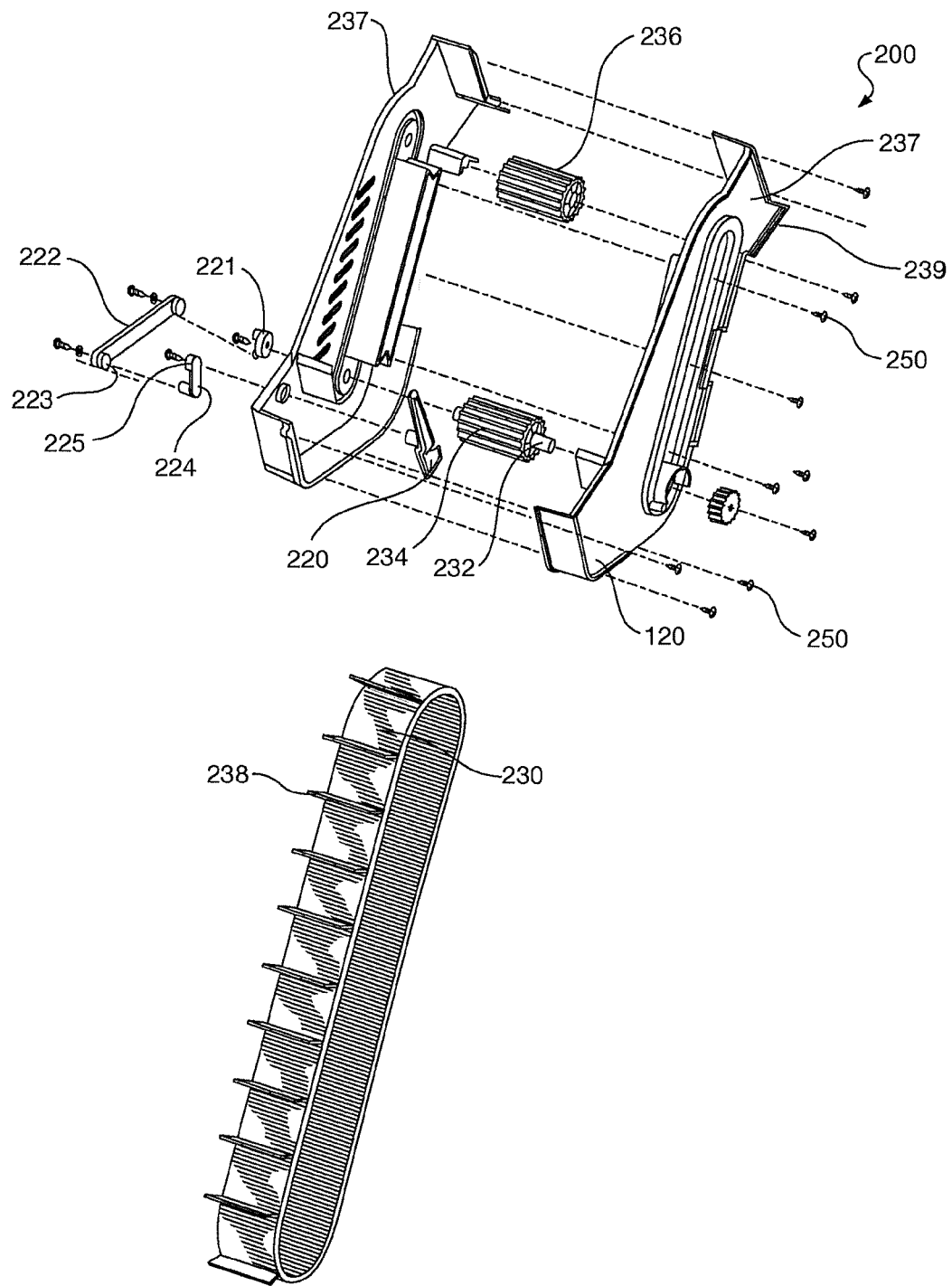

FIG. 2C is another perspective view of at least a portion of the conveyor system 200. Here, the conveyor system 200 is shown from a side opposite that of FIG. 2A. No food is seen in the conveyor belt 230. FIG. 2D is another perspective view of portions of the conveyor system 200, but with components shown in exploded-apart relation. Multiple threaded connectors 250 are seen, also exploded apart. The conveyor system 200 will be discussed with reference to FIGS. 2A through 2D, together.

As noted, the conveyor system 200 first includes a conveyor belt 230. The conveyor belt 230 is fabricated from a durable and flexible material, such as rubber, synthetic rubber, plastic, or combinations thereof. Preferably, the conveyor is fabricated from a material that can be easily wiped or suctioned for removing food particles.

The conveyor belt 230 may be about 1.5 to 3.0 inches in width, and $\frac{1}{16}$-inch to $\frac{1}{8}$-inch in thickness. The conveyor belt 230 may be one long, continuous seam of material; alternatively, the conveyor belt 230 may be assembled by linking two or three or more lengths of material together, end-to-end, to form a continuous loop.

The conveyor belt 230 has opposing first 231 and second 233 ends. The drive pulley 234 resides at the first end 231, which is the lower end, while an idle pulley 236 resides at the second opposing end 233, which is the upper end. The conveyor belt 230 rotates or cycles about the two pulleys 234, 236.

The drive motor 134 is in electrical communication with the micro-processor 160. This is preferably done through a wire 162 associated with the printed circuit board 161 residing within a same housing 132 as the electric motor 130, or otherwise residing within housing 105. The micro-processor 160 interfaces with a transceiver 164 that receives wireless signals from the control unit 170' and/or 170". The transceiver 164 will include an antenna (not separately shown) to radiate or receive radio waves or other wireless signals.

In operation, the drive motor 130 rotates the drive shaft 132 according to a designated speed. The speed may optionally be determined by the pet owner during programming using the control unit 170". As described more fully below, some larger dogs tend to gulp their food, creating health issues for the animal. For these owners, a "slow-feed" setting, or mode, may be selected that causes food to be dispensed from a conveyor end (seen in FIG. 1B at 239) much more slowly.

In any mode, the drive shaft 132 is mechanically engaged with and rotates the conveyor shaft 232. The conveyor shaft 232 resides within and rotates the drive pulley 234. The drive pulley 234 is mechanically connected to and turns the conveyor belt 230 at the first end 231. In this way, the conveyor belt 230 is rotated by the electric motor 130 and drive shaft 132 to pick up volumes of the dry pet food.

Of interest, the conveyor belt 230 includes a series of cleats, or raised ribs 238. In one aspect, the ribs 238 are spaced apart in 2-inch segments. Alternatively, the ribs 238 are spaced apart in 2.5-inch segments, or 3-inch segments. The ribs 238 are preferably about 0.75 to 2.5 inches in height. In this way, a volume between about 2.25 in$^3$ to 22.5 in$^3$ is provided for individual compartments 235.

The ribs 238 aid in the transporting of pet food 152 along the conveyor belt 230. Ideally, the ribs 238 are equidistantly spaced apart in such a manner as to create designed volumes within compartments 235. For example, a volume between ribs 238 may be ⅛th of a cup (1.8 in$^3$), or ¼th of a cup (3.6 in$^3$), or ½ of a cup (7.2 in$^3$). Rotation of the conveyor belt 230 is timed so that the conveyor belt 230 is advanced to deliver one ⅛th of a cup, or two ⅛th of a cup (i.e., ¼th of a cup), for example. Those of ordinary skill in the art will understand that the amount of food that is delivered in one cycle is a function of the length of time in which the motor 130 turns the drive shaft 132, and the volume of the compartments 235.

In one aspect, the user selects the slow-feed mode. This causes the drive shaft 132 to turn very slowly, such as 1.0 Hz, or 1.5 Hz, and over a period of time that is 30 seconds, or 40 seconds, for example. The result is that ⅛th of a cup of food is delivered over the 30 second, or the 40 second, time period. This forces the animal waiting for food to be delivered to eat slowly.

As noted, opposing walls 237 are provided along the conveyor belt 230. The walls 237 hold the pet food 150 between the raised ribs 138, thereby providing the compartments 235 described above. The walls 237 terminate at a chute 239. The chute 239 defines an exit opening, such that the pet food may be dropped from the chute 239 and into the food bowl 140 as the conveyor belt 230 is cycled. The chute is located at the end 136 of the conveyor belt 230.

Cycling of the conveyor belt 230 causes pellets of the dry pet food (shown at 152 in FIG. 1A) to move from the receptacle 120, along the conveyor belt 230, and into a separate feeding bowl 140. More specifically, pellets of food 152 are dropped from the chute 239 and into an opening (or open top) 145 in the bowl 140.

The conveyor belt 230 shown in FIGS. 2A through 2D is set at about a 50° angle. It is desirable to use at least a 15 degree angle, and more preferably at least a 20° angle, a 30° angle, or even a 45° angle relative to horizontal to provide clearance for the chute 239 above the bowl 140.

In one aspect, the conveyor system 200 includes a brush above the conveyor belt 230 at the lower end 231. The brush is not shown in the drawings, but it is understood that the brush would maintain an even top level between the raised ribs 238. The brush would push excess food 152, or kibbles back towards a next compartment 235, thus helping to keep compartment volumes consistent.

To further aid in moving pellets 152 from the container 110 to the receptacle 120, an optional agitator 220 may be provided. The agitator 220 is seen in FIGS. 2A through 2C. In one embodiment, the agitator 220 defines an elongated tooth that extends upward from the receptacle 120 and into the lower opening 116 of the container 110. The agitator 220 reciprocates in order to move and dislodge pellets 152 at the base 114 of the container 114.

As shown best in FIG. 2C, the agitator 220 is reciprocated through a series of pivot connections 221, 223, 225. First, a pin resides along the conveyor shaft 232. This pin serves as a first pivot connection 221. A pair of arms 222, 224 resides intermediate the first pivot connection 221 and the agitator 220. The two arms 222, 224 are connected by means of a pin which serves as the second pivot connection 223. Finally, a third pin connects a distal end of the second arm 224 to a base 228 of the agitator 220. This pin serves as the third pivot connection 225.

As the conveyor shaft 232 rotates, the first pivot connection 221 is rotated. This causes a proximate end of the first arm 222 to rotate at the drive pulley 234. Movement of the proximate end of the first arm 222, in turn, imparts rotation of the pin at the second pivot connection 223. This rotational movement produces reciprocation in a proximate end of the second arm 224 at the second pivot connection 223. As one of ordinary skill in the art will understand, this, in turn, imparts a rotational movement at the third pivot connection 225.

In operation, the volume of food 150 that is dispensed by the conveyor system 200 is correlated to time. Thus, the system 200 is designed so that, for example, operation of the motor 130 for 5 seconds produces two, ⅛th cup compartments 225 of food 150. In another aspect, a volume of pellets 152 dispensed is determined by tracking the number of raised ribs 138 that have passed by or across a visual or IR sensor. In either instance, the use of the conveyor system 200 with a conveyor belt 230 having compartments 225 between raised ribs 238 provides the user or pet owner with the ability to select different feeding methods and feeding times for their pet.

In accordance with embodiments disclosed here, feeding may be free-choice, wherein a bowl is filled once or twice a day, as needed by the user. In this instance, the conveyor belt 230 may be rotated a sufficient amount of time to substantially fill the feeding bowl 140. This may occur, for example, once in the morning and once in the evening as set by the pet owner using a digital timer. Alternatively, feeding may be incremental, thereby providing portion control. In this instance, a limited portion of food 150 is delivered by rotating the conveyor belt 230 for a shorter duration, but in, for example, two or four hour increments. This prevents the pet from eating too much food in one feeding.

In the animal feeding systems 100 of FIGS. 1A and 1C, a system is provided for accurately feeding a pet in controlled amounts and at controlled times. The system 100 is shown in the context of dry pellets 152. The pellets 152 gravitationally move from the container 110, down into the receptacle 120, and then along the conveyor belt 230. The pellets 152 are conveyed or moved to the chute 239 and then dropped into the feeding bowl 140 in response to rotational movement of the conveyor drive shaft 232, moving the drive pulley 234.

Different embodiments of the animal feeding system 100 may be provided.

Figure 3:
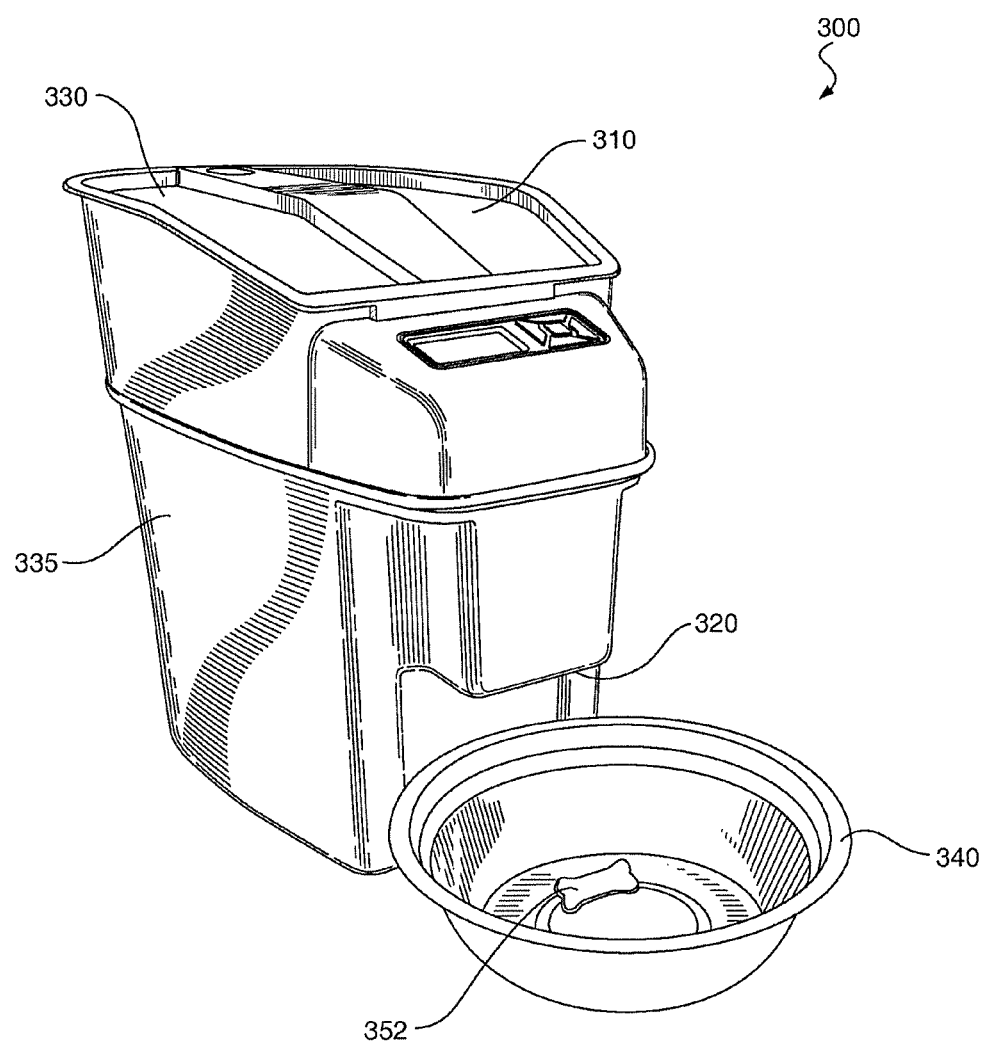
FIG. 3 is a perspective view of an animal feeding system. In this arrangement, separate compartments are provided for dry pet food and for pet treats.

First, FIG. 3 provides a perspective view a pet feeding system 300 that uses two separate containers—container 310 that holds dry pet food, and container 330 that holds solid treats. The pet feeding system 300 is shown with certain parts in exploded-apart relation so that containers 310 and 330 may be viewed.

The container 310 gravitationally releases dry pet food to a receptacle 320, while solid treats are gravitationally (or otherwise) dispensed from the container 330 to a treat receptacle 335. Both the food and the treats are ultimately dispensed into a bowl 340 using a conveyor system in accordance with system 200. Alternatively, treats may move down an angled surface and directly through the chute 239 by opening a small valve (not shown) or by turning a drive-screw (not shown).

A wall 345 is shown, separating the food container 310 from the treat container 330. It is noted, however, that the use of a container 330 and dispensing system for pet treats is optional and not preferred. Also seen in FIG. 3 is a bracket 346 for supporting the bowl 340 relative to the dispensing system 300.

The system 100 (or 300) may be controlled remotely by using a digitally programmable control unit 170. In one aspect, the user control unit resides on a fixture, such as an appliance, near the animal feeding system 100.

Figure 4:
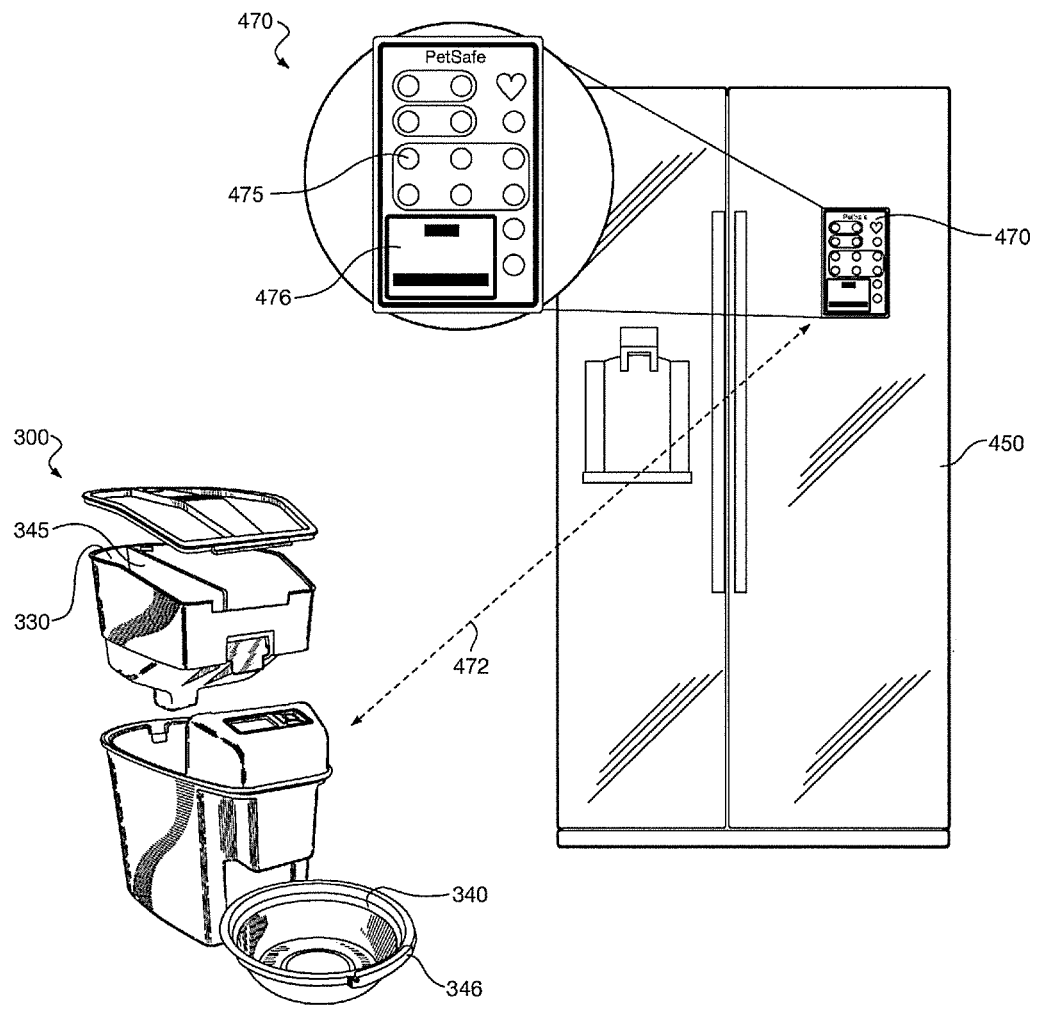
FIG. 4 illustrates the animal feeding system of FIG. 3 in operative relation to a remotely located user control unit. The control unit is configured to magnetically and removably reside on the door of a refrigerator, and is used for controlling or programming the animal feeding system, in one embodiment. Certain components of the feeding system are shown in exploded-apart relation.

FIG. 4 is a general view of the animal feeding system 300, wherein the system 300 is residing in a user's kitchen. Here, the micro-processor 160 is controlled by a dedicated remote control unit 470. The remote control unit 470 presents various buttons 475 for sending commands and establishing settings for the animal feeding system 300 as the user interface. The remote control unit 470 communicates wirelessly with the system 300 through an RF, Zigbee, Bluetooth®, or Wi-Fi transceiver or other wireless protocol to send wireless signals 472.

The remote control unit 470 is intended to reside close to the animal feeding system 300. In the illustrative arrangement of FIG. 4, the remote control unit 470 is shown residing magnetically on a refrigerator door 450. In this instance, the animal feeding system 400 resides in or near a user's kitchen.

The control unit 470 includes an optional "emotional feed button" 476. This button 476 may be pressed by the user to reward a pet. Pressing button 476 causes a treat to be dispensed from the treat container 330 and into the bowl 340. Alternatively, individual food pellets 152 may be dispensed from the receptacle 320.

Figure 5:
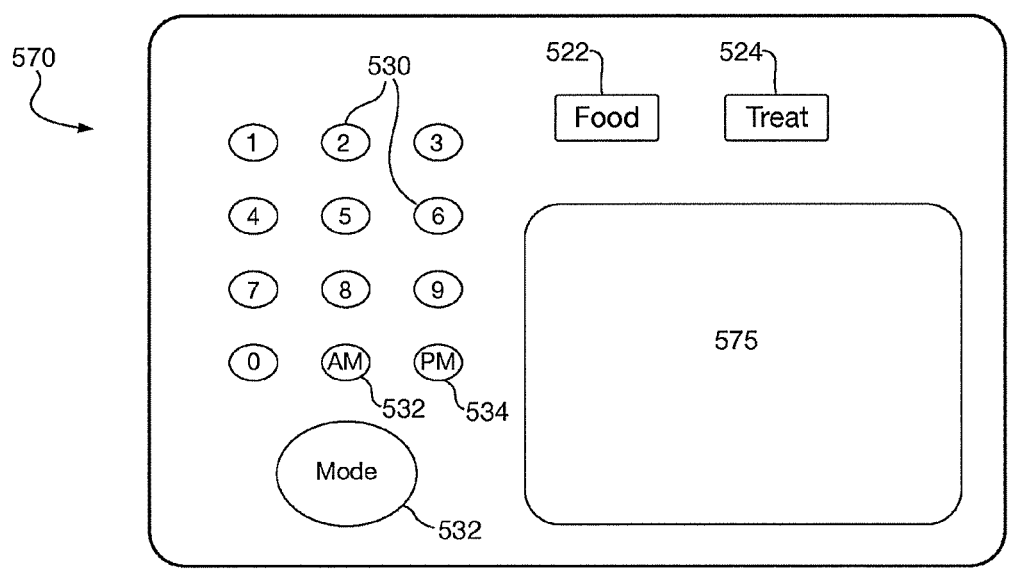
FIG. 5 is an enlarged plan view of a control panel designed to reside on the housing of the animal feeding system, in one embodiment. In this arrangement, the control panel serves as a user control unit.

As an alternative to the remote control unit 470 residing near the animal feeding system 300, the system 300 may have a user interface that resides on the housing 305 of the system 300 itself. FIG. 5 is a perspective view showing a control unit 570, in one arrangement. The control unit 570 is shown in an enlarged view.

The control unit 570 may first include an LCD display screen 575. The screen 575 may be an interactive touch screen. Alternatively or in addition, the control unit 570 may have separate pressure-sensitive command buttons. These buttons may include, for example, numerical (or alpha-numerical) buttons 530, an "a.m." time button 532, and a "p.m." time button 534.

The control unit 570 may optionally have separate "Food" 522 and "Treat" 524 buttons. These allow the user to program the dispensing of food and treats separately. The control unit 570 may also have a "mode" button 532 which allows the user to cycle through feeding options. These feeding options are discussed in more detail below.

Figure 6:
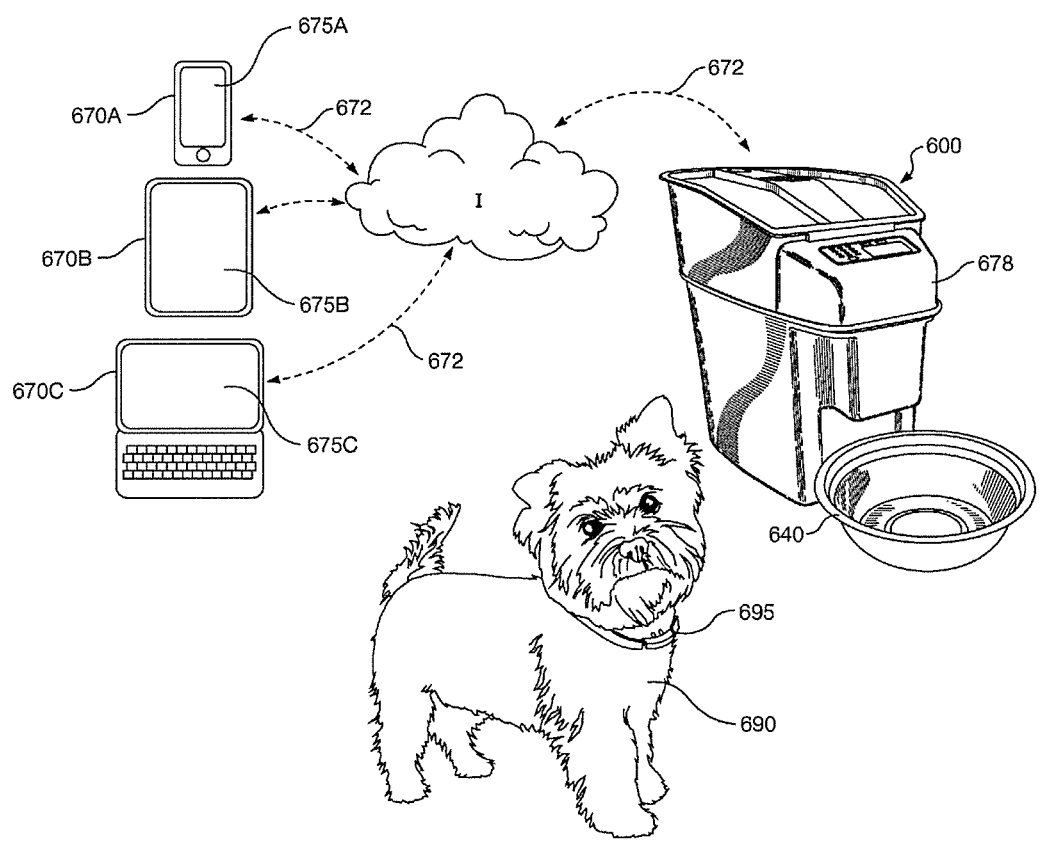
FIG. 6 is perspective view of an animal feeding system in electrical communication with alternative user control units. Here, the control units are remote control units.

As noted, a pet feeding system may alternatively be controlled remotely using a personal digital assistant, a portable tablet, or a computer. FIG. 6 is schematic view of an animal feeding system 600. This is intended to represent a system such as the feeding system 100 of FIG. 1. In the arrangement of FIG. 6, the animal feeding system 600 is in electrical communication with alternative user control units 670A, 670B, 670C.

A first control unit 670A represents a so-called smart phone or personal digital assistant. The personal digital assistant 670A includes a display 675A that serves as a user interface. Examples of a suitable personal digital assistant include the iPhone® from Apple, Inc. of Cupertino, California, the Samsung® Galaxy of Samsung Electronics Co., Ltd. of the Republic of Korea, and the Droid RAZR® provided by Motorola, Inc. of Schaumburg, Illinois (It is acknowledged that Motorola, Inc. (or its telecommunications-related assets) may now be owned by Google, Inc. and that trademarks are likely owned by a trademark (or other IP) holding company out of Cerritos, California.)

A second illustrative control unit 670B is a so-called tablet. The tablet 670B includes a display 675B that serves as a user interface. Examples of a suitable tablet include the iPad® available from Apple, Inc., the Google® Nexus tablet, the Samsung® Galaxy tablet, the Amazon® Kindle Fire tablet, the Lenovo® ThinkPad tablet, and the Microsoft® Surface tablet. Tablets are also considered personal digital assistants.

A third illustrative control unit 670C represents a general purpose computer. The computer 670C also includes a display 675C that serves as a user interface. General purpose computers may include the iMac® available from Apple, Inc., the Connectbook™ available from Hewlett-Packard Development Company, L.P. of Houston, Texas, the Inspiron® from Dell Computer Corporation of Round Rock, Texas, and the ATIV® from Samsung Electronics Co., Ltd.

Where a personal digital assistant 670A or a tablet 670B is used as the processor, a dedicated software application, or "App," will need to be uploaded. Where a general purpose computer 670C is used as the processor, a software package may be downloaded from the Internet or uploaded from a so-called thumb drive or other device having memory. More preferably, a web-based application is used.

In any of the remote devices 670A, 670B, 670C, a wireless signal 672 is sent to the feeding system 600. This will require the feeding system 600 to have a transceiver (shown generally at 678 but consistent with transceiver 164) capable of receiving wireless signals. Such signals are preferably cellular-based signals sent through a wireless telecommunications network. However, other communications protocols may be used such as a co-axial cable connection through a so-called cable subscription or satellite service. Alternatively, a traditional land-based telephone line may be used.

In one aspect, the animal feeding system 600 is able to determine the presence of an animal. An animal is shown schematically at 690. The animal 690 is wearing a collar having a communication device 695. The communication device 695 is in accordance with the device described in U.S. Pat. No. 8,436,735 entitled "System for Detecting Information Regarding an Animal and Communicating the Information to a Remote Location." The named inventor in that patent is Chris Mainini of Knoxville, Tennessee. The '735 patent is assigned to Radio Systems Corporation and is incorporated herein by reference in its entirety.

In the arrangement of FIG. 6, the communication device 695 delivers a signal to the animal feeding system 600 confirming the presence of the animal in front of the bowl 640. When the presence of pet 690 is sensed, a certain portion of food may be dispensed or a certain treat may be dispensed by the conveyor belt 230. In one embodiment, the system 600 may be able to discern between several pets, each of whom is wearing a communication device 695. When the presence of a second pet (shown at 1195 in FIG. 11) is sensed, a different portion of food may be dispensed or a different type of treat may be dispensed. Operation of such a system is described further in U.S. Pat. Publ. No. 2011/0297090, entitled "Animal Feeding Apparatus." That application is also owned by Radio Systems Corporation and is incorporated herein by reference in its entirety.

Each of the remote devices 670A, 670B, 670C will have a display 675A, 675B, 675C. The display 675A, 675B, 675C will provide information to the pet owner about the status of the animal feeding system 600. Particularly, the display 675A, 675B, 675C will present a user interface that allows the pet owner to set or change the feeding mode and the feeding schedule.

In one aspect, the animal feeding system 600 includes a module (not shown). The module is offered as an aftermarket product that allows a feeding system that otherwise does not include a transceiver associated with the microprocessor 160 to communicate wirelessly with the remote device 670A, 670B, 670C.

FIGS. 7A through 12C present an animal feeding system 700 with different displays on a control unit 770. The control unit 770 is intended to represent a personal digital assistant. The control unit 770 may be either a so-called smart phone or a tablet. The control unit 770 serves as a user interface for ultimately sending signals 772 to the animal feeding device 700 according to programming instructions that have been input by the user.

The user control unit 770 is in communication with an animal feeding device 700. Preferably, communication takes place through a web-based platform, or application, that sends signals to the feeding device 700. Such signals may be through a telecommunications network "I".

Figure 7A:
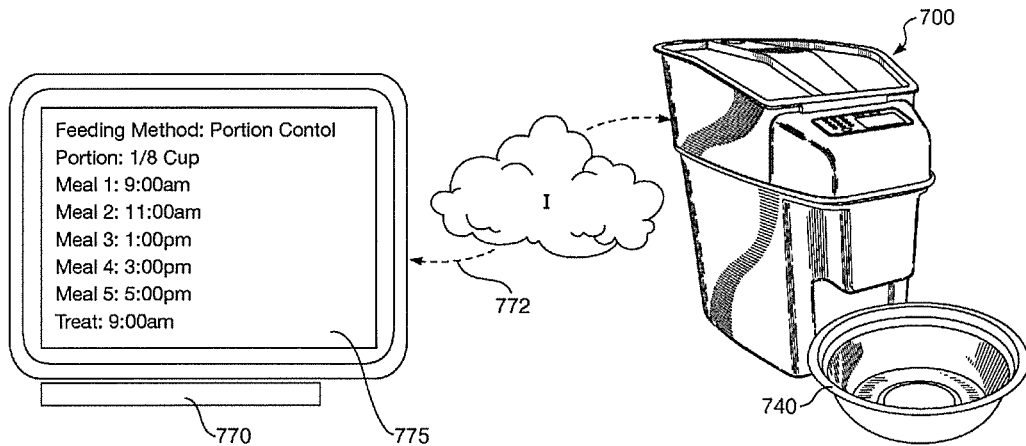
FIGS. 7A and 7B present schematic views of a conveyor-operated animal feeding system in wireless electrical communication with a remote user control unit. A display of the control unit is shown.

The displays on the control unit 770 demonstrate optional feeding modes and functions for the system 700, in different embodiments. FIG. 7A is a schematic view showing a first display 775 for the control unit 770. In the view of FIG. 7A, the display 775 presents a feeding schedule. The feeding schedule operates according to a portion-control feeding method. Using the control unit 770, the pet owner inputs a desired portion of food and the times of day for feeding. The pet owner may set as many feeding times per day as desired. The option is also available to repeat a designated cycle each day, or on certain days of the week. In the display 775, each portion is ⅛th of a cup, with feeding being on two hour increments from 9:00 am to 5:00 pm.

Figure 7B:
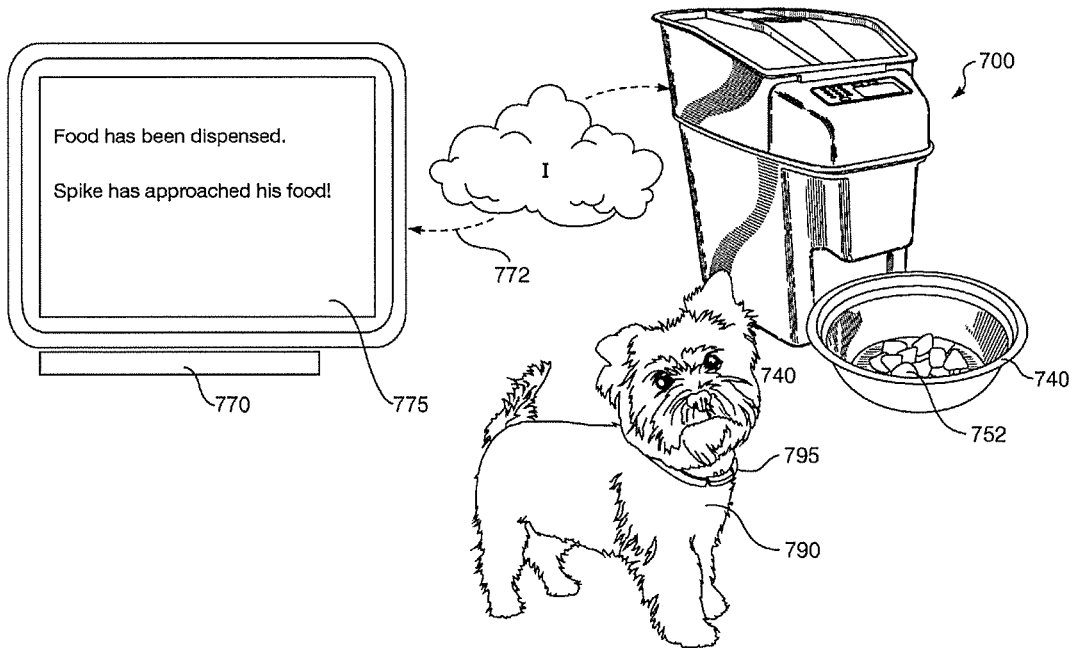

FIG. 7B is a second schematic view showing the control unit 770 of FIG. 7A in wireless communication with the animal feeding device 700. Here, a real time status report concerning feeding is shown in the display 775. The display 775 shows that food has been dispensed. In addition, the display 775 shows that the pet 790 has approached the feeding bowl 740.

In FIG. 7B, pellets 752 of dry food are shown in a feeding bowl 740. In addition, a pet 790 is positioned in front of the feeding bowl 740. The pet is wearing a communication device 795. The communication device may again be in accordance with the device described in U.S. Pat. Publ. No. 2008/0190379 entitled "System for Detecting Information Regarding an Animal and Communicating the Information to a Remote Location." The communication device 795 is worn by the pet 790 and communicates with the control unit 770, either directly or through the feeding system 700, to inform the control unit 770 that the pet 790 is in position to eat from the feeding bowl 740, or is at least in close proximity to the animal feeding device 700.

It is again observed that the pet 790 is fitted with a collar having a transmitter as the communication device 795. The transmitter is customized to communicate with the animal feeding device 700 through IR, Zigbee or Bluetooth®, or other wireless signal protocol. These signals inform the animal feeding device 700 that the pet 790 has approached the bowl 740.

It is preferred that the display 775 shows whenever food 752 has been dispensed. This is beneficial to the remote pet owner who is not home to see food in the bowl 740. Thus, the pet owner will receive a notification via a text message or through a software application on their personal digital assistant 770. Optionally, a notification will also indicate when the pet 790 has approached the bowl 740. These messages are again shown on the illustrative display 775 of FIG. 7B.

Figure 8A:
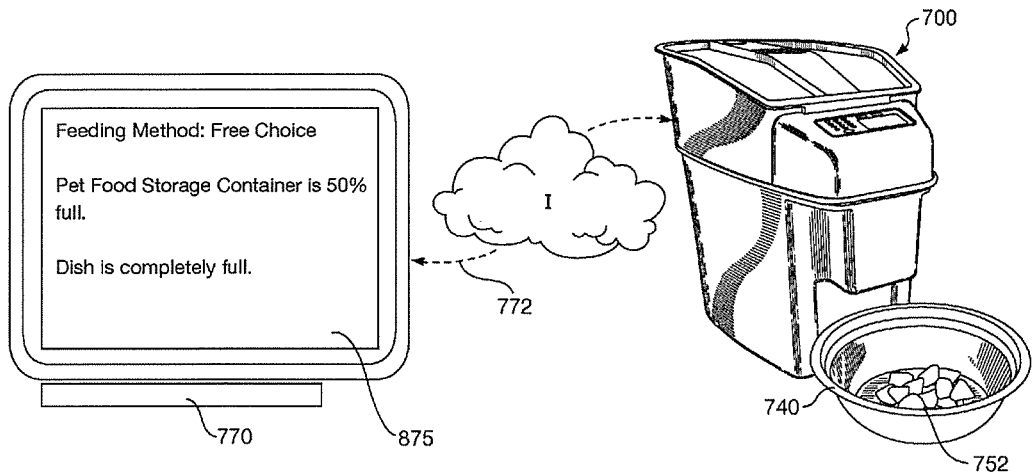
FIGS. 8A and 8B present additional schematic views of a conveyor-operated animal feeding system in wireless electrical communication with a remote user control unit. A display of the control unit is again shown.

FIG. 8A is another schematic view showing a display 875 for the control unit 770. The control unit 770 is again in communication with the animal feeding device 700 through a telecommunications network "I." In the view of FIG. 8A, the display 875 does not present a feeding schedule; instead, the system 700 is now programmed to keep the feeding bowl 740 substantially full. This is according to a free-choice feeding method as selected by the pet owner.

As shown in FIG. 8A, the bowl 740 has dog food 752 therein. The bowl 740 is optionally equipped with a weight sensor or an IR sensor that senses when the bowl 740 has dropped below a certain weight or when the food 752 has fallen to a certain level. At such points, the conveyor belt 230 is automatically activated to re-fill the bowl 740. Beneficially, the conveyor system 200 of the present invention is able to equate time of activation with volume of food dispensed.

In the display 875, the pet owner is informed that the food storage container 710 is 50% full. This is based on readings from a separate sensor. Such a sensor may also be a weight sensor that senses when the container 710 has dropped below a certain weight, or an IR sensor that senses when the food 752 in the container 710 has fallen to a certain level. The display 875 also informs the owner that the feeding bowl 740 is "completely full" of food 752. The owner receives this notification via text message or "app" message to be reassured that his or her pet has plenty of food.

Figure 8B:
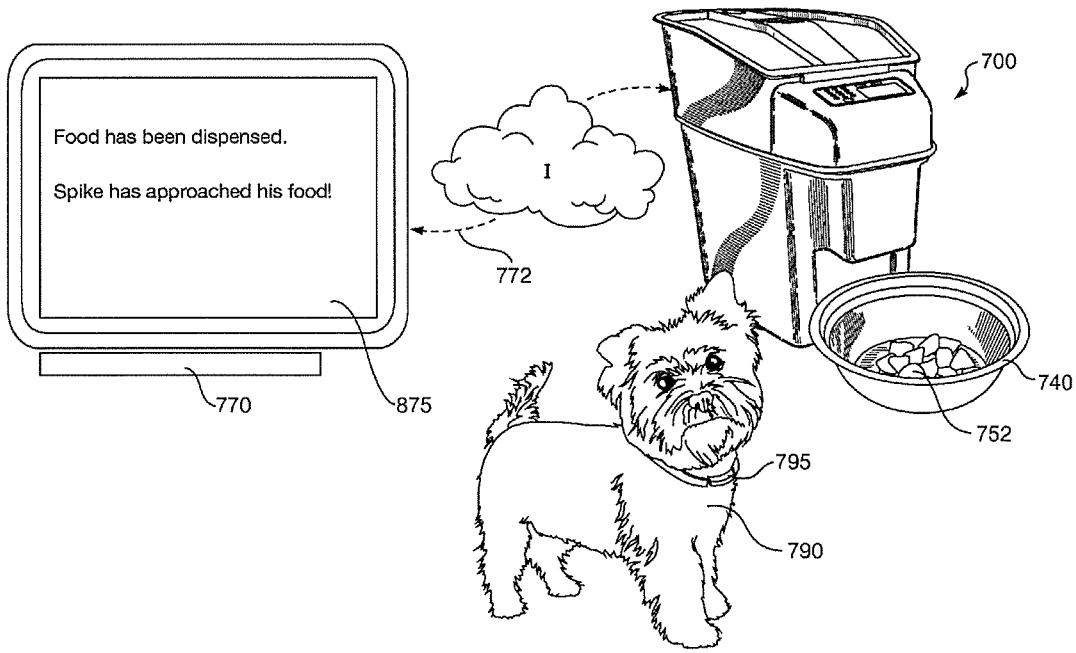

FIG. 8B is a second schematic view showing the control unit 770 in wireless communication with the animal feeding device 700. Here, a message is being shown in the display 875 that a pet has approached the bowl 740. The feeding bowl 740 remains full of dry pellets 752.

It is noted that in FIG. 8B, a pet is again shown schematically at 790. The pet 790 is positioned in front of the bowl 740. The pet 790 is wearing a communication device 795 in accordance with the Mainini device described in U.S. Pat. No. 8,436,735. The communication device 795 is worn by the pet 790 and communicates with the control unit 770, either directly or through the feeding system 700, to inform the control unit 770 that the pet 790 is in position to eat from the feeding bowl 740.

Figure 9A:
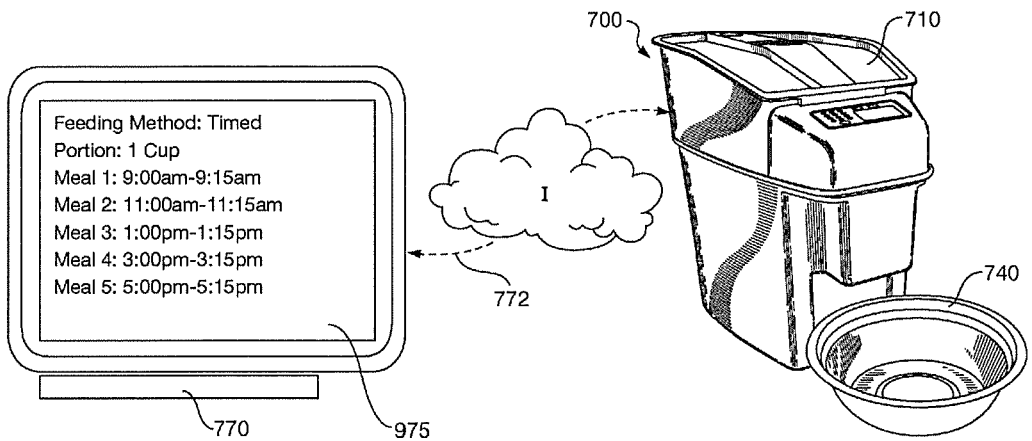
FIGS. 9A, 9B and 9C present additional schematic views of a conveyor-operated animal feeding system in wireless electrical communication with a remote user control unit. A display of the control unit is again shown.

FIG. 9A is another schematic view showing a display 975 for the control unit 770. The control unit 770 is again in communication with the animal feeding device 700 through a wireless communications network "I." In the view of FIG. 9A, the display 975 again presents a feeding schedule. Here, the feeding schedule offers food portions to be dispensed periodically in 1 cup increments. Feeding begins at 9:00 a.m., followed by feeding periods of 15 minutes every 105 minutes. Thus, food is available for a 15 minute period and then is removed from pet access.

In the view of FIG. 9A, the feeding bowl 740 is empty (or food is otherwise unavailable). In operation, the pet owner selects a time at which feeding is to be completed for each increment. This is done using the control unit 770. At the end of the feeding increment, a base in the bowl 740 is opened or tilted, causing food to be emptied from the bowl 740 and dropped into a storage area (not shown). The food may be retrieved by the owner later and returned to the container 710. As an alternative embodiment, a cover may rotate over the top of the bowl 740 between feeding increments. This may be, for example, in accordance with the teachings of U.S. Pat. No. 6,401,657, also owned by Radio Systems Corporation.

Figure 9B:
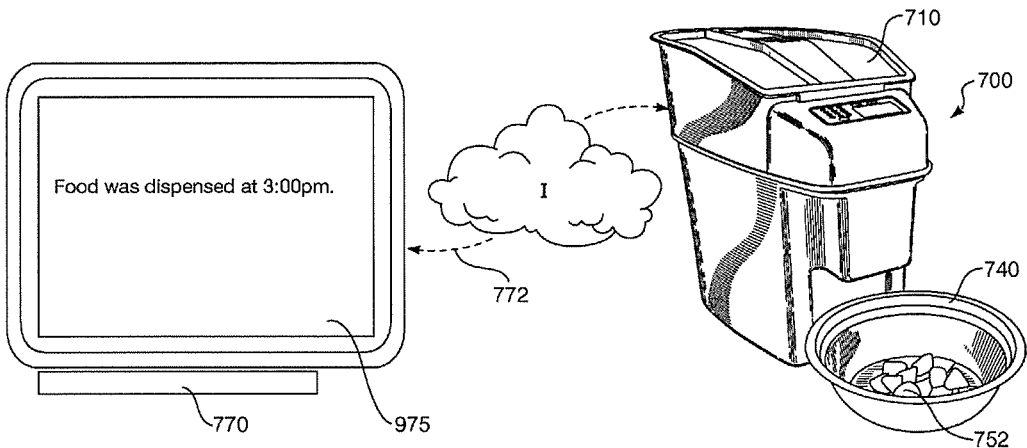

FIG. 9B is a second schematic view showing the control unit 770 in wireless communication with the animal feeding device 700. Here, a real time status report concerning feeding is shown in the display 975. The display 975 shows that food was dispensed at 3:00 p.m. The bowl 740 has pellets 752 in it for the pet 790.

Figure 9C:
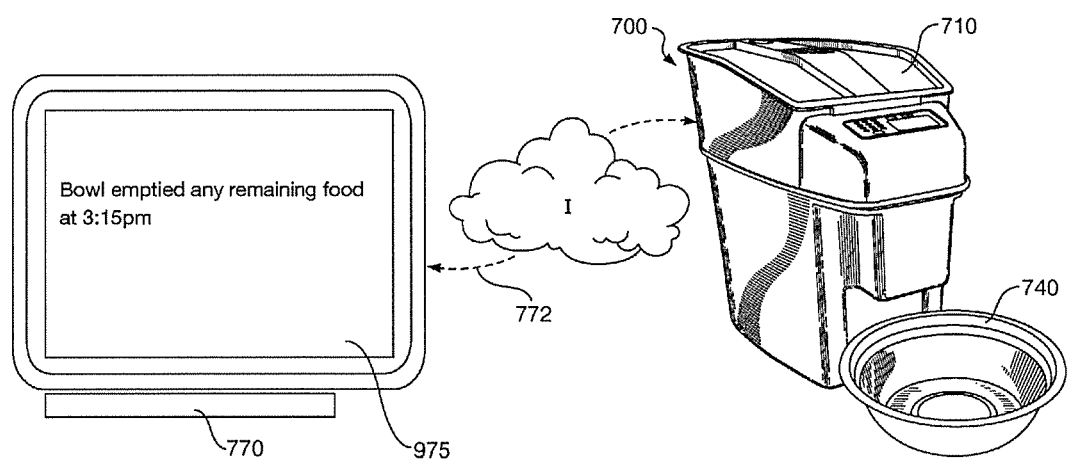

FIG. 9C provides a third schematic view of the control unit 770 in wireless communication with the animal feeding device 700. Here, a new real time status report concerning feeding is shown in the display 975. The display 975 shows that the feeding bowl 740 was emptied of any remaining food at 3:15 p.m. It can be seen in FIG. 9C that the bowl 740 has no pellets 752 in it for the pet.

Figure 10A:
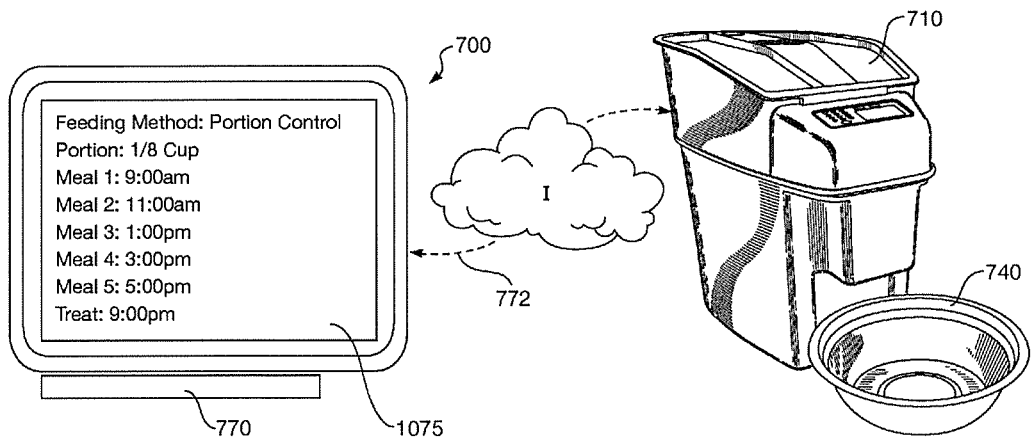
FIGS. 10A and 10B present additional schematic views of a conveyor-operated animal feeding system in wireless electrical communication with a remote user control unit. A display of the control unit is again shown.

FIG. 10A is another schematic view showing a display 1075 for the control unit 770. The control unit 770 is again in communication with the animal feeding device 700 through wireless signals 772. In the view of FIG. 10A, the display 1075 presents a new feeding schedule. The feeding schedule operates according to a portion-control feeding method, wherein each portion is ⅛th of a cup. Feeding takes place in two hour increments from 9:00 am to 5:00 pm.

The display 1075 of FIG. 10A differs from the display 775 of FIG. 7A in that a treat is scheduled to be dispensed at 9:00 p.m. In addition, the conveyor belt 230 is programmed to move slowly so that food is dispensed continuously but slowly over the course of a 10 to 15 minute period, depending on pet needs. This prevents the animal from gulping its food.

In FIG. 10A, a bowl 740 is shown with the animal feeding system 1000. The bowl 740 is empty as a treat has not yet been dispensed.

Figure 10B:
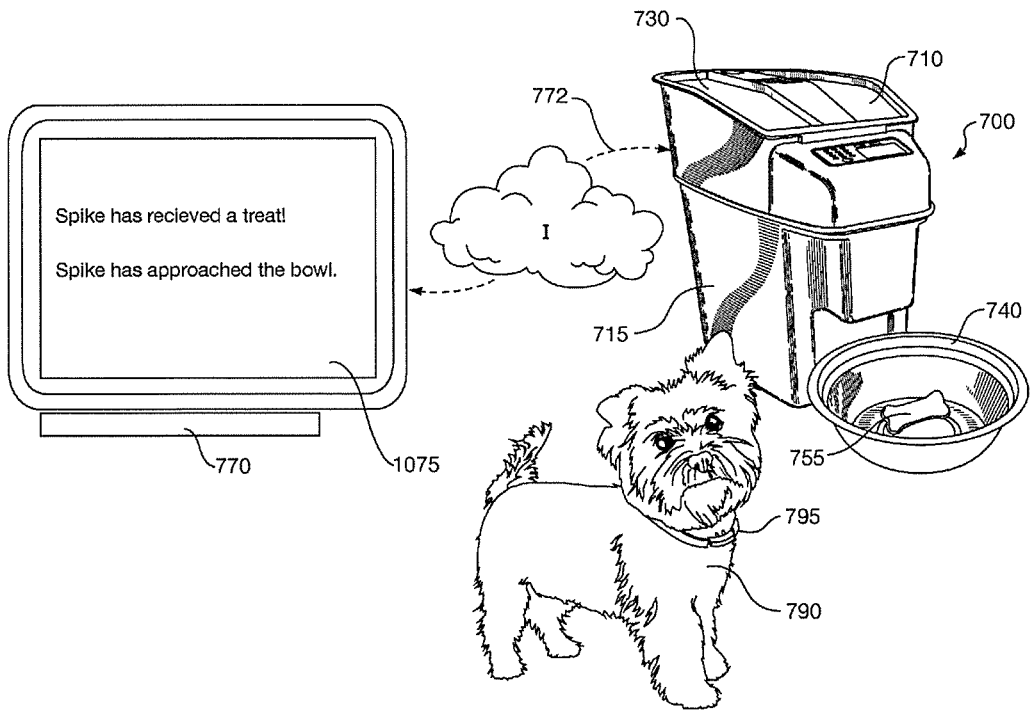

FIG. 10B is a second schematic view showing the control unit 770 in wireless communication with the animal feeding device 700. Here, a real time status report concerning feeding is shown in the display 1075. The display 1075 shows that a treat has been dispensed. "Spike has received a treat." In addition, the display 1075 shows that the pet has approached the bowl 740.

In FIG. 10B, a treat 755 is shown in the bowl 740. The treat 755 was dispensed from a treat container 715 associated with the dispensing system 700. In addition, the pet 790 is positioned in front of the bowl 740. The pet 790 is wearing a collar communication device 795 that electronically interfaces with the control unit 770.

Figure 11:
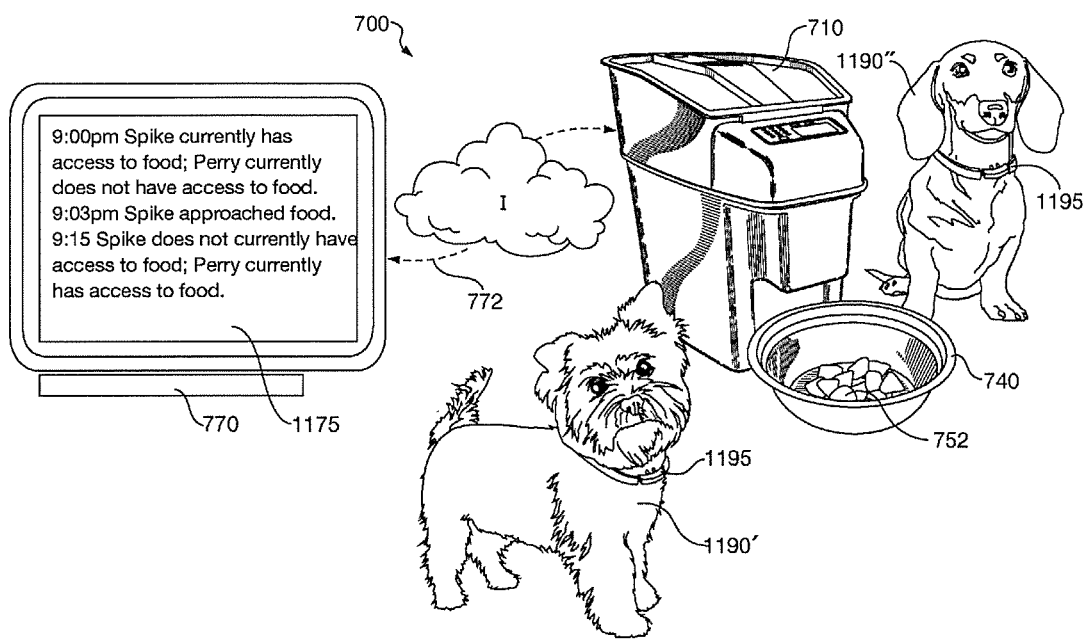
FIG. 11 is a schematic view showing a user control unit in wireless communication with a conveyor-operated animal feeding device. Here, a real time status report of feeding activity is provided on a display.

FIG. 11 is yet another schematic view of the control unit 770 in wireless communication with the animal feeding device 700. A display 1175 for the control unit 770 is seen. Here, a real time status report of feeding activity is provided on the display 1175. The display 1175 provides reports for two different animals, named Spike and Perry. The animals are also shown at 1190' and 1190".

In FIG. 11, pellets 752 of food have been dispensed into a feeding bowl 740. In addition, each of pets 1190' and 1190" has approached the bowl 740. Each pet 1190' and 1190" is wearing a communications device 1195 that electronically interfaces with the control unit 770. In one aspect, the feeding system 700 includes a sensor that senses when each animal is in immediate proximity to the bowl 740 through the communications device 1195, and then sends a signal 772 to the control unit 770.

According to the display 775, at 9:00 pm one animal 1190' (Spike) does not have access to the bowl 740, while the other animal 1190" (Perry) does have access to the bowl 740. However, at 9:15 pm Perry 1190" has access to the bowl 740 while Spike does not. This is a demonstration of a selective access feeding method.

Selective access may be accomplished in one of several ways. This may be by enclosing the feeding bowl 740 in a separate housing with a door that allows or restricts access based on reading the communication device 1195 on the pets 1190', 1190". Alternatively, the bowl 740 itself may be covered with a panel (not shown) that moves to cover or uncover the food 752 when triggered by a communications device 1195. Alternatively, the bowl 740 may move, such as by rotation, to a covered or uncovered position. Alternatively still, a stimulus mechanism on the collar may be activated when the animal comes into proximity to the feeding bowl 740 at the wrong time. Such a stimulus may include a noise or the delivery of a mild electrical stimulus sent through electrodes mounted on the collars.

As can be seen, a novel animal feeding system is offered herein. The feeding system offers improved mechanical features over existing devices, including a durable conveyor system that will not bind or become clogged because of lodged food pellets. Further, the feeding system enables a user to employ multiple feeding methods through a programmable control unit, including a slow-feed method which provides a timed distribution of food in small quantities. Still further, the feeding system provides two-way communication by plugging in a connected accessory, giving the pet owner the convenience of taking a non-connected product and creating a wireless connection with the pet owner using an application that can be uploaded onto a personal digital assistant, or accessed using a general purpose computer through a website.

A method of delivering dry pet food to an animal is also provided herein. The method generally includes providing a bowl. The bowl defines a wall and an interior basin for holding a dry pet food. The method also includes filling a container with the pet food. The food in the container is positioned to gravitationally fall into a receptacle below the container. The method also includes programming an animal feeding system that periodically activates a conveyor belt for transporting the dry pet food into the bowl.

The user may select from any of the following feeding methods:

(a) portion control feeding, wherein a designated amount of food is dispensed into the feeding bowl one or more times per day, such designated amount being less than a full volume of the feeding bowl;

(b) slow-feeding, wherein a designated amount of food is dispensed into the feeding bowl one or more times per day, but with the conveyor cycling at a substantially reduced rate to limit the presentation of food to the pet;

(c) free choice feeding, wherein a set portion of food is always available to the pet to eat from whenever they desire;

(d) timed feeding, wherein a set portion of food is available to the pet for a certain period of time, and then removed at the end of that set period of time;

(e) treat dispenser feeding, wherein a solid pet treat is dispensed automatically according to a timer, or immediately in response to a signal sent by the user through a remote control unit; and (f) selective access feeding, wherein the animal feeding system is able to distinguish between two or more pets such that a selected pet is unable to access a feeding bowl at certain times.

Figure 12A:
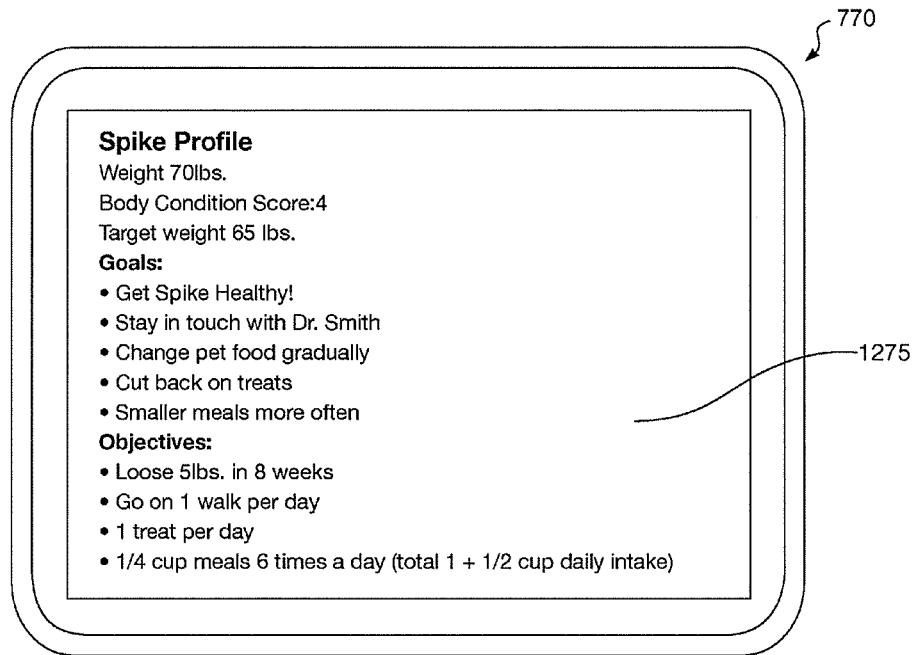
FIG. 12A presents an illustrative display from the user control unit of FIG. 11, showing health status and goals for a pet.

The present method also allows the pet owner to input data about a pet. The data appears on a display. FIG. 12A presents an illustrative display 1275 from a control unit 770. The display 1275 presents health status and goals for a pet.

Figure 12B:
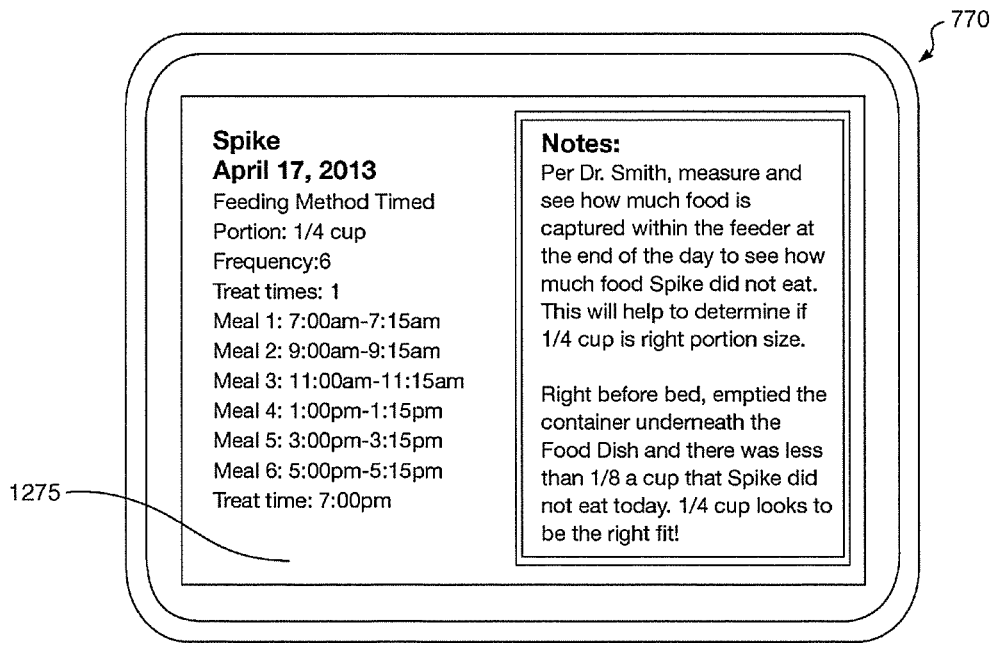
FIG. 12B presents another illustrative display from the control unit of FIG. 11, showing a feeding schedule and user notes.
Figure 12C:
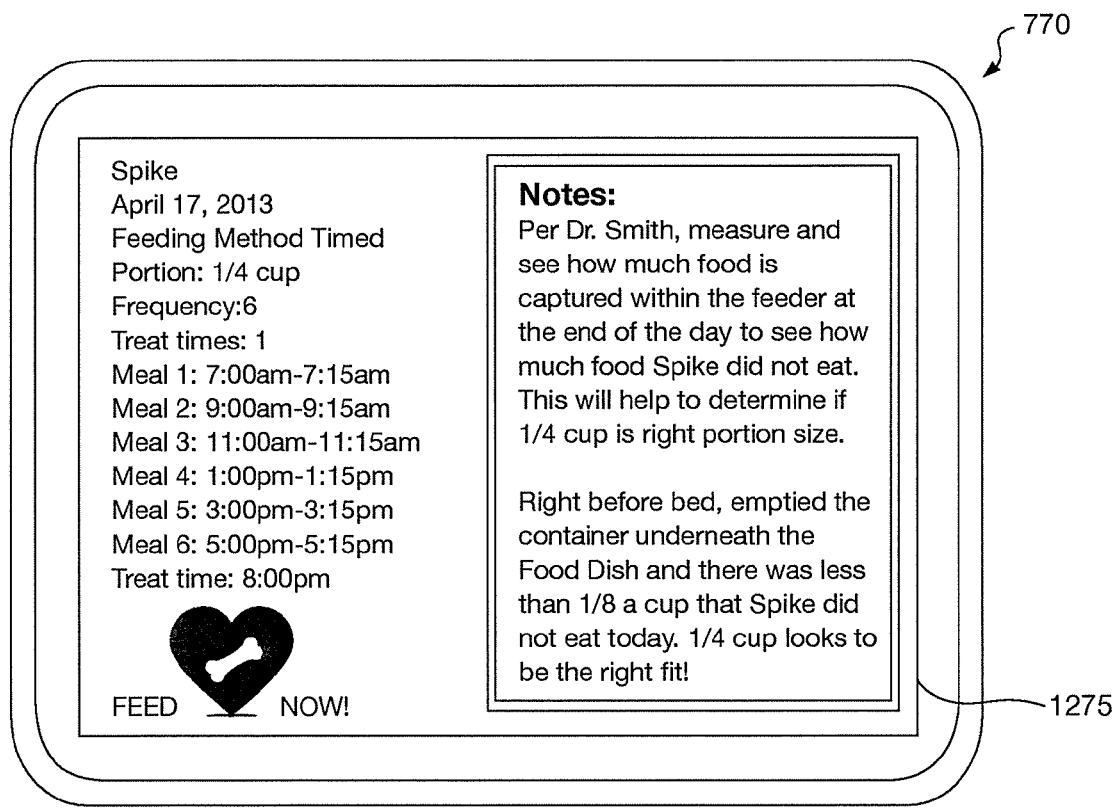
FIG. 12C presents still another view of the display from the control unit of FIG. 11. An emotional feed button is shown, ready to dispense a treat.

FIG. 12B presents the same display 1275. Here, the display 1275 shows a feeding schedule and user notes. FIG. 12C is still another view of the display 1275. Here, an emotional feed button is shown, ready to dispense a treat. User notes are also shown.

The display 1275 of FIGS. 12A, 12B and 12C demonstrate that the animal feeding systems herein may be used as part of a holistic weight management system. The weight management system enables the user to track, record, monitor and maintain their pet's weight and feeding routines. Such data can also be shared, reviewed and altered with the interaction of a veterinarian.

The automatic animal feeding system can be set up and operated locally through a control unit that is located on the device itself. In one embodiment, the pet owner can also attach a "module" that will allow the feeding device to be accessed via wireless communication. In this scenario, a software application may be downloaded to communicate with the module and to interface with and operate the animal feeding system remotely.

In certain embodiments, the system notifies the pet owner when food or a treat have been dispensed, as well as when the pet has approached the bowl (that is, when the pet is wearing a communications collar). In one aspect, the system will also alert the pet owner when the container and the bowl are at full, half full, or near empty status. If there is a power issue, the system will alert the owner as to the battery status.

An animal feeding system is described herein. One embodiment of the system is disclosed in FIGS. 1A to 2D. Such disclosure describes an electrical/mechanical pet feeder system 100 using a conveyor system 200 to dispense pet food. FIG. 1A shows the animal feeding system. FIG. 1C is another perspective view of the animal feeding system 100 of FIG. 1A. In this view, the housing 105 (as seen in FIG. 1A) has been removed to expose a conveyor belt 230 within the receptacle 120. The conveyor belt 230 is broken up into compartments (shown at 235 in FIG. 2B), and is cycled by a drive motor 130 that is operated by a controller. The controller is preferably a micro-processor or microcontroller 160.

Figure 13:
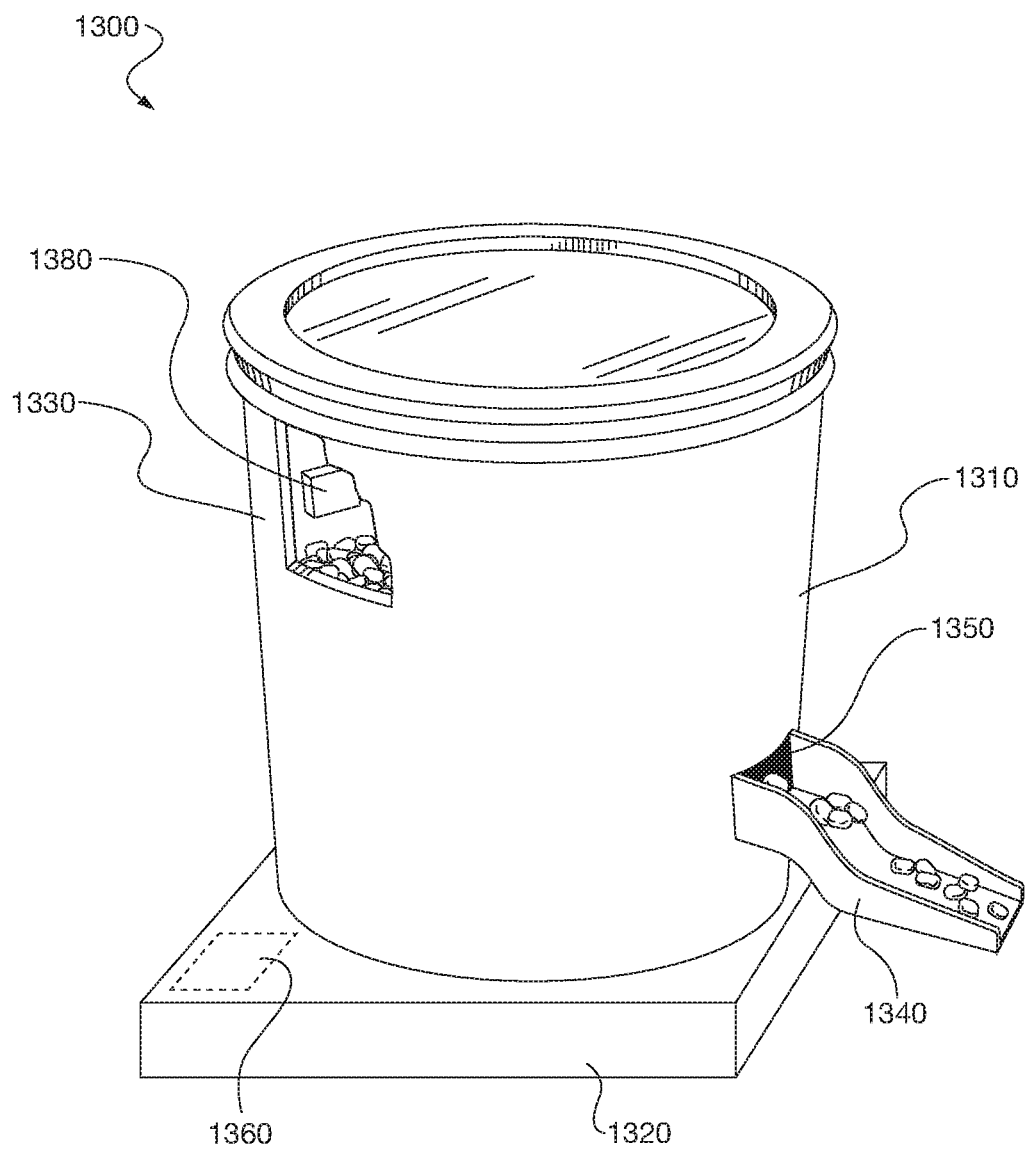
FIG. 13 is a perspective view of an animal feeding system, under an embodiment.

FIG. 13 shows another embodiment of an animal feeding system 1300. The system 1300 includes a pet food receptacle 1310 residing on a platform base 1320. The receptacle dispenses food 1330 (as seen in the cutout of FIG. 13) through an opening 1350 and into a feeding chute 1340 but embodiments are not so limited. The receptacle 1310 may comprise a retractable door/wall (not shown) positioned between an interior of the receptacle and the chute 1340 for controlling delivery of the food to the chute. A user may fill the receptacle 1310 with pet food 1330. Under one embodiment, pet food in the receptacle 1310 may then gravitationally dispense into the chute 1340 when the door is open. Therefore, positioning of the door (fully open, partially open, etc.) for a given period of time controls the amount of food dispensed into the chute 1340. In lieu of a conveyor system, an internal raised floor may be positioned within the receptacle 1310 at approximately the level of the opening's 1350 lower end. Such floor may facilitate dispensing of food and prevent build up and eventual spoilage of food at a lower end of the receptacle 1310. Alternatively, a conveyor system may be used to deliver food to the chute.

The chute 1340 may further direct any dispensed food into a dish or bowl (not shown). A dish or bowl may ship together with the food dispensing system 1300. The distal end of the chute may itself comprise a bowl/dish. Alternatively, a user may purchase a separate dish or bowl and simply use such dish or bowl in connection with the food dispensing system 1300 to receive food from a chute 1340. A user may simply position a bowl beneath or in proximity to the distal end of the chute 1340 for receiving the pet food. One embodiment may eliminate the chute altogether and place a bowl beneath an opening in a receptacle 1310 configured to dispense food directly into a bowl. Under this embodiment, the platform base 1320 may comprise a recessed portion to receive the bowl so that the bowl is positioned directly underneath the opening.

As described above, the feed system 1300 may rely on a simple retractable door and chute 1340 to gravitationally dispense food 1330 to a bowl. Further, the receptacle may deliver pet food to the chute 1340 using some form of the conveyor system 200 described above with respect to FIGS. 1A to 2D. As seen in such figures and corresponding disclosure, a conveyor system 200 is configured to move pellets of pet food according to timed cycles. To do this, the conveyor system 200 works in conjunction with a drive motor 130. The motor 130 may be battery operated, but may alternatively operate under line power.

When activated, the drive motor 130 turns a drive shaft 134. The drive shaft 134, in turn, rotates a conveyor shaft (shown at 232 in FIG. 2B) and connected drive pulley (shown at 234 in FIG. 2B). The mechanical interface between the drive shaft 132 and the conveyor shaft 232 may be by means of a gear. Turning of the conveyor shaft 232 causes the conveyor belt 230 to be actuated. In this way, the conveyor belt 230 is rotated by the electric motor 130 to pick up volumes of the dry pet food from the receptacle 120 (as seen in FIGS. 1A-2D).

The conveyor system shown in FIGS. 1A-2D describes a conveyor belt disposed at an inclination to transport food along the belt within the receptacle to a point at which the food drops off the belt through an opening and into a bowl/dish. The feeding system 1300 of FIG. 13 may similarly feature a conveyor belt within the receptacle 1310. Such receptacle may integrally incorporate angled surfaces within its interior to funnel pet food to a conveyor belt "pick up" location within the receptacle 1310. However, the receptacle 1310 may also receive and partially support a container (not shown) analogous to the container 110 shown in FIGS. 1A-2D and which includes a lower inwardly angled portion residing within the receptacle 1310 and taking the shape of a funnel. Such lower portion may then direct pet food to a conveyor belt a "pick up" location within the receptacle 1310. Such conveyor belt then operates to deliver food directly to the chute 1340 via opening 1350.

It should be noted that the feeding system 200 set forth above in FIGS. 1A-2D features a chute that itself functions as a simple opening. In accordance with such system, dispensed food drops through an opening and into a dish or bowl. The feeding system 1300 of FIG. 13 features a chute 1340 comprising a sloping channel or slide for conveying food to a lower level.

A proximal end of the chute 1340 may itself extend into the interior of the receptacle (not shown) to form an interior compartment for receiving food from the conveyor belt. A retractable door may separate the interior compartment from the exterior portion of the chute 1340. In operation, the conveyor belt transports the food 1330 along the belt to a point at which the food drops off the belt and into such interior compartment. Opening the door then dispenses the food into the chute 1340. The apex of the chute itself may be sufficiently elevated such the food deposited into chute 1340 gravitationally travels down the chute and into the bowl. The proximal end of the chute 1340 may be sufficiently sloped to facilitate gravitationally dispensing the food.

A conveyor belt may comprise a series of compartments formed by walls disposed along the surface of the conveyor belt (see FIG. 2D for an example) for holding defined volumes of dry pet food. Variations in the volume of such compartments and rotational speed of the conveyor belt enable delivery of variable food portions. The microcontroller or microprocessor controlling the drive shaft of a conveyor system may track the belt's period of rotation during operation and therefore track and monitor volume of dispensed food in view of conveyor belt's configuration, i.e. volume of belt compartments. Note that the microcontroller of the conveyor system is communicatively coupled with microcontroller 1360 and may transmit dispensing information to microcontroller as further described below.

As indicated above, FIG. 13 shows an animal feeding system 1300 comprising a pet food receptacle 1310 positioned on a platform base 1320. The platform base 1320 includes a microcontroller 1360. Alternatively, the receptacle may itself comprise the microcontroller 1360. A microcontroller is a small computer on a single integrated circuit containing a processor core, memory, and programmable input/output peripherals. Program memory in the form of SRAM, FLASH, and EEPROM are also often included on such chip. Microcontrollers are designed for embedded applications.

Microcontrollers are used in automatically controlled products and devices, such as automobile engine control systems, implantable medical devices, remote controls, office machines, appliances, power tools, toys and other embedded systems. By reducing the size and cost compared to a design that uses a separate microprocessor, memory, and input/output devices, microcontrollers make it economical to digitally control even more devices and processes.

A microcontroller may be considered a self-contained system with a processor, memory and peripherals. Such system can be used as an embedded system to provide designated functionality. The majority of microcontrollers in use today are embedded in other machinery, such as automobiles, telephones, appliances, devices and peripherals for computer systems. Such embedded systems may perform directed functions within other devices such as the animal feeding system 1300 as further described below.

The microcontroller 1360 of base 1320 includes or is coupled to a transceiver for transmitting and receiving wireless communications. Accordingly, the microcontroller 1360 serves as a communications module enabling wireless network communications.

Figure 14:
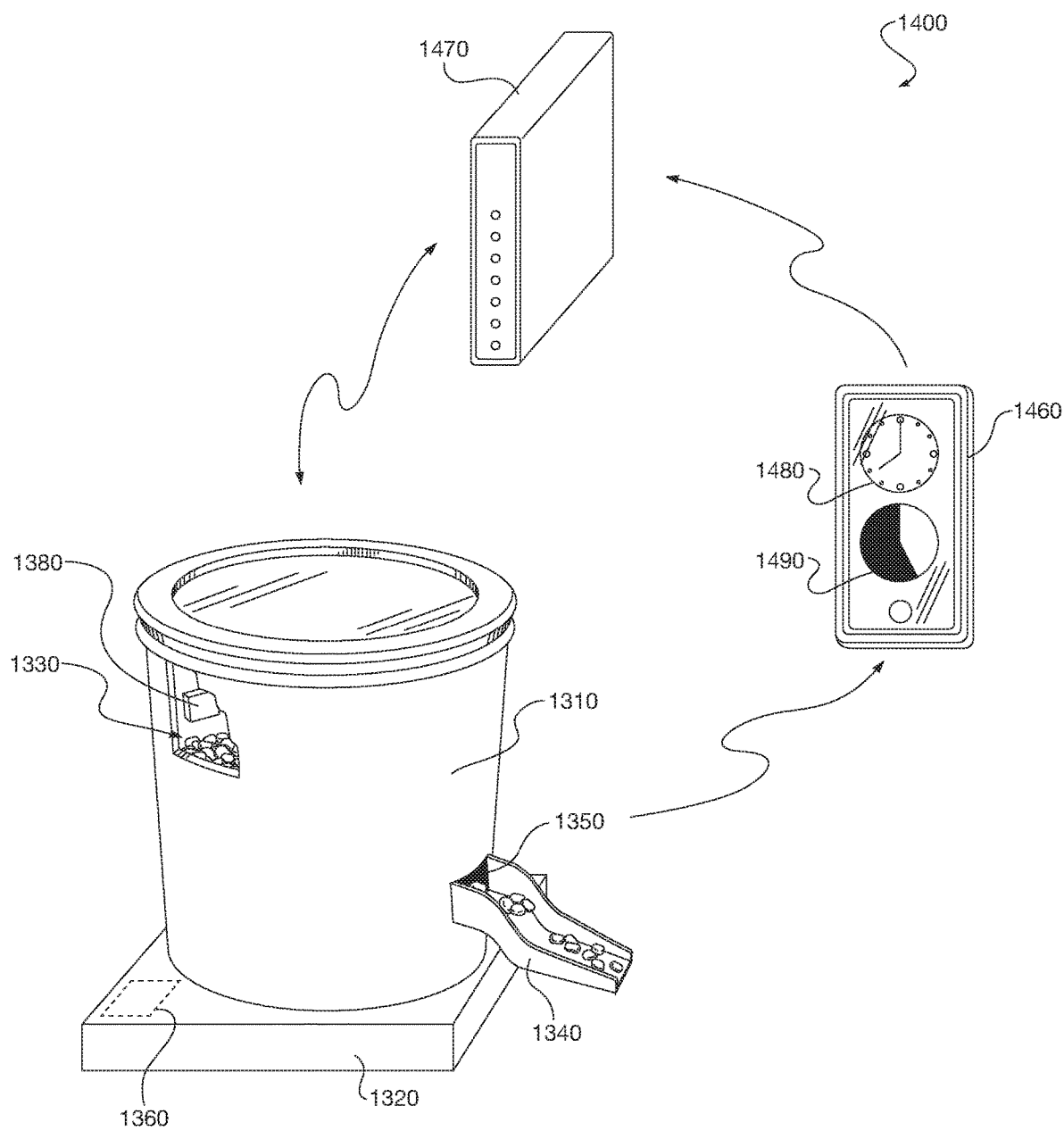
FIG. 14 shows an animal feeding system communicatively coupled with a smartphone and an access point through a wireless communications network, under an embodiment.

FIG. 14 shows a wireless network 1400 comprising the microcontroller 1360 of the feed system 1300, a smartphone 1460 (generally belonging to an operator of the food dispensing system 1300), and a wireless router or communications hub 1470. All such components are communicatively coupled through the wireless network 1400. As indicated above, the microcontroller 1360 either includes or is coupled to a transceiver for transmission and receipt of wireless communications. The smartphone 1460 and local router/hub 1470 are similarly equipped with networking capability.

The wireless network 1400 of FIG. 14 comprises under one embodiment a Wireless Local Area Network (WLAN). The WLAN enables communications among networked components using Wi-Fi protocols. Wi-Fi (or WiFi) is a local area wireless computer networking technology that allows electronic devices to network, mainly using the 2.4 gigahertz Ultra High Frequency (UHF) and 5 gigahertz Super High Frequency (SHF) ISM radio bands.

The Wi-Fi Alliance defines Wi-Fi as any wireless local area network (WLAN) product based on the Institute of Electrical and Electronics Engineer' (IEEE) 802.11 standards. However, the term "Wi-Fi" is used in general English as a synonym for "WLAN" since most modern WLANs are based on these standards. "Wi-Fi" is a trademark of the Wi-Fi Alliance. The "Wi-Fi Certified" trademark can only be used by Wi-Fi products that successfully complete Wi-Fi Alliance interoperability certification testing.

Many devices can use Wi-Fi, e.g. personal computers, video-game consoles, smartphones, digital cameras, tablet computers and digital audio players. These can connect to a network resource such as the Internet via a wireless network access point (e.g. wireless router). Such an access point (or hotspot) has a range of about 20 meters (66 feet) indoors and a greater range outdoors. Hotspot coverage can be as small as a single room with walls that block radio waves, or as large as many square kilometers achieved by using multiple overlapping access points.

Wi-Fi can be less secure than wired connections, such as Ethernet, precisely because an intruder does not need a physical connection. Web pages that use TLS are secure, but unencrypted internet access can easily be detected by intruders. Because of this, Wi-Fi has adopted various encryption technologies. The early encryption WEP proved easy to break. Higher quality protocols (WPA, WPA2) were added later.

Under this WiFi embodiment, the microcontroller 1360 of base 1320 and the smartphone 1460 (both WiFi enabled) communicate with the WiFi router 1470 which is itself coupled to one or more Wide Area Networks (WANs) to provide general internet connectivity. Note also the smartphone 1460 and the microcontroller 1360 may also communicate directly with each other using WiFi communications protocols.

The wireless network 1400 of FIG. 14 comprises under an alternative embodiment a Wireless Personal Area Network (WPAN). A personal area network (PAN) is a computer network used for data transmission among devices such as computers, telephones and personal digital assistants. PANs can be used for communication among the personal devices themselves (intrapersonal communication), or for connecting to a higher level network and the Internet (an uplink).

A wireless personal area network (WPAN) is a personal area network—a network for interconnecting devices centered on an individual person's workspace—in which the connections are wireless. Wireless PAN is based on the standard IEEE 802.15. One type of wireless technology used for WPAN is Bluetooth®. Bluetooth® uses short-range radio waves over distances up to approximately 10 meters. For example, Bluetooth® devices such as a keyboards, pointing devices, audio headsets, printers, and embedded microcontrollers may connect to personal digital assistants (PDAs), smart phones, routers, or computers wirelessly. Further, a WPAN may also enable communications among networked components using Wireless USB, Zigbee or Z-Wave communication protocols.

Under this WPAN embodiment, the microcontroller 1360 of base 1320 and the smartphone 1460 (both capable of at least one form of the WPAN compatible communications described above) communicate with the local router which is itself coupled to one or more Wide Area Networks (WANs) to provide general internet connectivity. Note also the smartphone 1460 and the microcontroller 1360 may also communicate directly with each other using WPAN communications protocols (i.e. using at least one form of the WPAN compatible communications described above).

The microcontroller 1360 of the food dispensing system 1300 may comprise an embedded system for controlling the timing and amount of food delivered to a chute 1340 of the food dispensing system 1300. As one example, the microcontroller may present food delivery options (amount/timing) to a user through an LCD touchscreen interface or a keypad positioned on or connected to an exterior surface of the food dispensing system 1300. A user may then use the keypad or touchscreen to schedule the release of selected meal portions at particular times or during specified time intervals. Under one embodiment, one or more applications running on at least one processor of the smartphone may present the user with an interface for programming the release of food through the feeding system 1300 at a particular time or within a given time interval. The smartphone then transmits the scheduling information to the microcontroller 1360 via the WLAN/WPAN (or directly via device to device communications) which then transmits control signals to the conveyor system of the pet feeding system 1300. (Note that a microcontroller controlling the drive motor of such conveyor system is also communicatively coupled with microcontroller 1360. Therefore, such conveyor microcontroller may receive control signals and transmit food dispensing information to microcontroller 1360 of base 1320.

The microcontroller 1360 may under an embodiment receive dispensing information from the conveyor system of the pet feeding system 1300. The conveyor system or other detection components within the receptacle 1310 may monitor the level of pet food within the receptacle. Under another embodiment, the pet food receptacle is positioned over a platform base 1320 as seen in FIG. 14. The base 1320 may under this embodiment comprise a scale. The scale monitors the weight of the feeding system components including the pet food. The conveyor system, scale or other detection device are communicatively coupled with the microcontroller 1360 and transmit fill level data to the microcontroller 1360. Alternatively, the detection device may comprise an infrared sensor 1380.

When the pet food fill level of the receptacle falls below a threshold level (as interpreted by microcontroller 1360), the microcontroller 1360 may automatically initiate communications via the local router/hub 1470 with an e-commerce application in order to re-order food for the feeding system. (It should be noted that threshold level metrics correspond to the detection device. For example, in view of a scale sensor, threshold level data comprises weight data). Under one embodiment, the microcontroller 1360 may simply notify the user via LCD display or smartphone application interface that food levels are low. The user may then initiate e-commerce re-ordering via a smartphone application interface. Such smartphone application and interface are further described below. Alternatively, the LCD display may be coupled to the WLAN/WPAN. A user may then initiate e-commerce re-ordering via the LCD display directly.

FIG. 14 shows a smartphone 1460 communicatively coupled with the feeding system 1300 and a local router 1470. As indicated above, a combination of the conveyor system, scale and/or other detection device within the feeding system 1300 provides fill level and food dispensing information to the microcontroller 1360. The microcontroller may then provide such information to the user's smartphone. The microcontroller may deliver such information to the smartphone using direct wireless communications. Alternatively, the microcontroller may communication such information via the local router to one or more applications running on at least one processor of a remote server. The one or more applications may then communicate the fill level/food dispensing information to the user's smartphone using general internet connectivity. Accordingly, the remotely hosted applications may provide system 1300 information to remotely located smartphones or mobile computing platforms (i.e., remote to the local WLAN/WPAN network). Conversely, an application running on a smartphone may provide an ability to configure, control and monitor system 1300 functionality and activity from a remote location.

The application running on the smartphone may provide the user an interface displaying fill level/food dispensing information. As seen in FIG. 14, the interface provides the user fill level information in the form of a pie chart 1490. As another example, the interface may display the date and time 1480 that the system 1300 dispenses meals including the amount of delivered food. (Such interface displays may use any combination of interface pages, displays, icons, and general workflow components to display such information). The smartphone also provides a user configuration options. As already described above with respect to FIGS. 5-12C, an interface may provide the user an opportunity to configure the times and volumes of meals to be dispensed to an animal. The interface may also provide the user an opportunity to reorder food for the system 1300. The user may automate reordering of food (via the application) when feed levels in the receptacle drop below a certain threshold (and as reported to the application via microcontroller 1360) or may simply rely on food level alerts to prompt a manual reordering of food using the application interface. As indicated above, the smartphone application provides the user an ability to configure, control and monitor system 1300 functionality and activity from a remote location.

Figure 15:
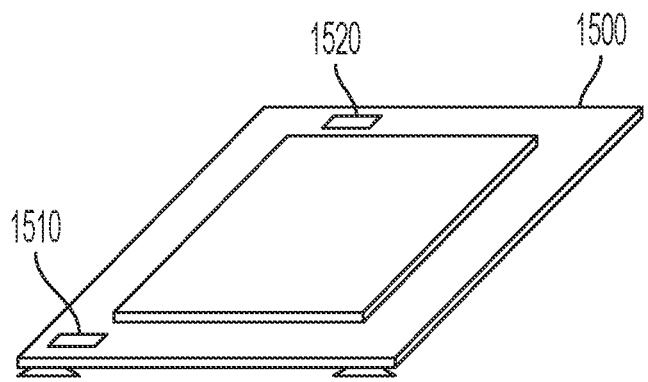
FIG. 15 shows a tare weight scale, under an embodiment.

An alternative embodiment of an animal feeding system places a removable weight scale underneath a pre-existing food containment or storage unit. FIG. 15 shows a weight scale which may then serve as a platform for a food storage unit. The scale integrates with a preexisting food containment unit of the user's choosing and tracks the food levels by weight. In the embodiments described below, the scale operates to monitor food levels in a storage/container unit while a separate pet feeder dispenses the food. The scale monitors fill levels of the storage/container as a user transfers food from the storage/container unit to the dispensing device.

FIG. 15 shows a weight scale 1500, under an embodiment. The scale includes a tare button 1510 for establishing tare weight as described below. The scale includes one or more processors 1520 configured to wirelessly communicate with remote devices as described below. One or more applications run on the one or more processors for controlling functionality of the scale. The applications are configured to establish tare weight as further described below. Further, the one or more applications may track fill level of a container. The one or more applications may also estimate the rate at which food is removed from the container. Such information may be used to predict the fill levels of the container, i.e. to predict when the fill level of the container will be low.

It should be noted that scales generally use a tare weight at zero. As an alternative, tare weight is calibrated to a desired fill level of the food container unit. Under an embodiment, a user may pour an amount of food to a fill level that corresponds to a threshold level indicating a need to reorder. A user then hits the tare button. In future operation of the scale, when the food weight matches the baseline weight or a tare threshold, the replenishment process is initiated.

Scales generally activate upon sensing a certain amount of weight. However, when the scale operates as a removable base of a pet food storage unit, weight is always present on top of the scale. The scale may therefore be alternatively configured to wake up (i) on a time delay, (ii) based on proximity detection of nearby movement, or (iii) upon detection of slight changes in weight. In using these types of detections, the scale may be powered by batteries rather than powered from a wall outlet.

Figure 16:
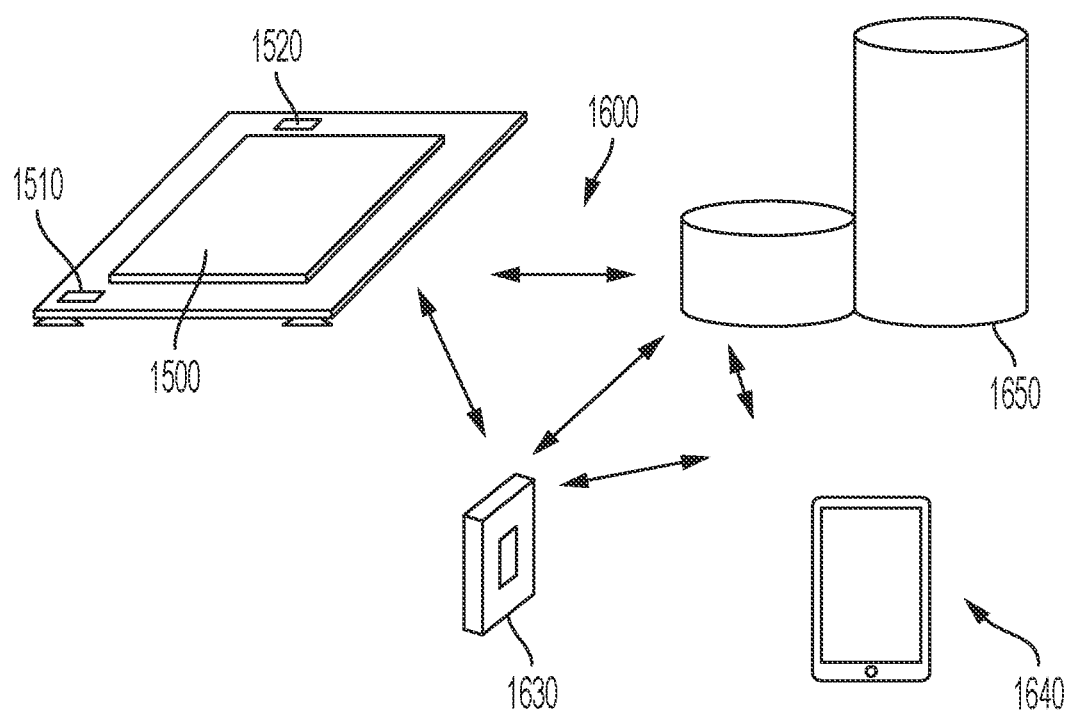
FIG. 16 shows a tare weight scale in a networked environment, under an embodiment.

FIG. 16 shows a wireless network 1600 comprising at least one processor 1520 of the tare scale 1500, a smartphone 1640, a wireless router or communications hub (or other access point) 1630, and a pet feeder 1650. All such components are configured to communicatively couple through the wireless network 1600. As already described in detail above with respect to FIG. 13 and FIG. 14, the wireless network may comprise a WPAN or WLAN network. The router 1630 may provide general internet connectivity. Under an alternative embodiment, the network of FIG. 16 may exclude the router 1630. Under this embodiment, the pet feeder 1650 may provide general internet connectivity. Further, the tare scale 1500, smartphone 1640, and pet feeder 1650 may communicate directly with each other using wireless communications protocols implemented by WPAN/WLAN networks.

As one example of the scale in operation, the scale is positioned under a pet food storage unit. The scale then weighs the payload. This operation may be implemented via a button on the device or a virtual button in a smartphone application communicatively coupled with the scale. There is a process to initialize the scale for use with a user's food container. First, the scale is placed into a setup mode. This is performed by press of a button (or coded press such as a long press or double press of a button) on the physical device or a similar press of a virtual button in the application. Instructions are then shown to the user (through an electronic display on the scale or smartphone). Step 1, set the scale on a flat surface. The display indicates advance to Step 2 which instructs a user to add an empty container on top of the scale. The display indicates advance to Step 3 which instructs a user to add the amount of food to the container that triggers a low food event. The one or more applications running on processor 1520 measure the weight of the container including food at a low threshold level. The display indicates advance to Step 4 which instructs a user to fill the container with food. The one or more applications running on processor 1520 then measure the weight of the container and food including the additional food amount. The applications running on processor 1520 intermittently assess payload weight to determine if a notification is required. If the monitored weight matches the threshold weight level (which incorporates the weight of the container itself as described above), the one or more applications may send instructions to one or more remote e-commerce applications to initiate the replenishment process, i.e. to place a resupply order for food. This instruction may be routed to remote e-commerce applications through any one or combination of router, pet feeder, and smartphone device.

Figure 17:
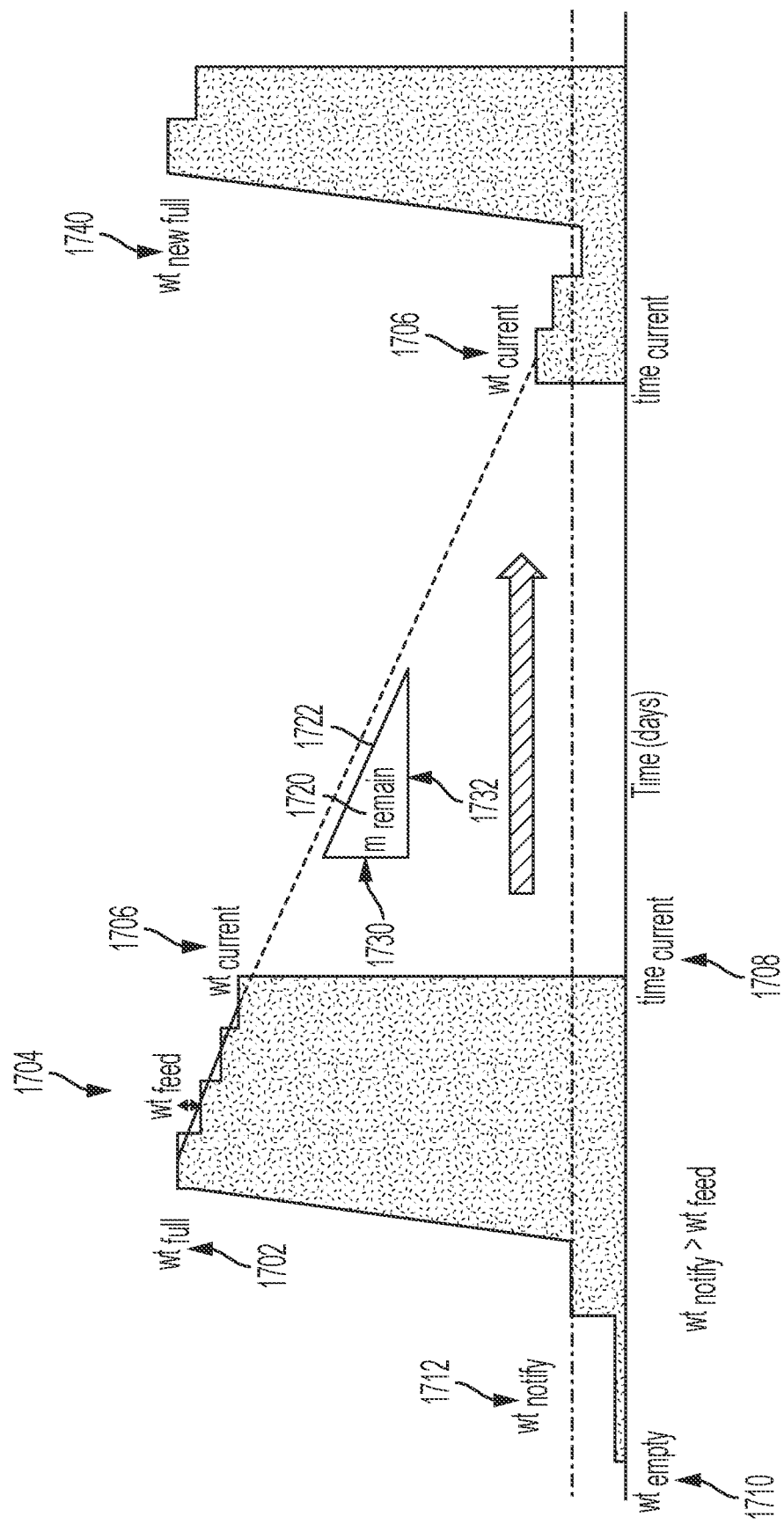
FIG. 17 shows a model for estimating rate of consumption, under an embodiment.

The one or more applications running on processor 1520 may implement a model to estimate food usage over time in order to forecast food usage. The device may log the food decrease increments. By knowing the average and standard deviation of food decrease increments the device may predict how many feedings remain in the storage container. The timestamp of when the food increments are removed is also logged. This information may be used to estimate a rate of food consumption. FIG. 17 shows a model for estimating a rate of food consumption. The model for estimating rate of food consumption is further described below.

The rate of food consumption ($m_{remain}$) and other estimates described below may be computed using one or more of the following measurements:

$wt_{empty}$=weight of container without food
$wt_{full}$=weight of container including food at maximum level
$wt_{current}$=current weight of container including food
$wt_{feed}$=weight of food amount incrementally removed from container
$time_{current}$=a given time in days indicated along timeline
$time_{full}$=time when weight of container and food is returned to $wt_{full}$
$wt_{notify}$=weight of container and food at level triggering notification The rate of food consumption is then calculated as:

$$m_{remain} = \frac{wt_{current} - wt_{full}}{time_{current} - time_{full}}$$

FIG. 17 visually illustrates rate of food consumption over time. FIG. 17 shows a "weight full" 1702 ($wt_{full}$) measurement, i.e. the weight of a container including food at maximum level. FIG. 17 also indicates a "weight feed" 1704 ($wt_{feed}$) incremental measurement which indicates the amount of food removed from the container at pet feeding intervals. FIG. 17 displays the "current weight" 1706 ($wt_{current}$) current) of the container including food at a "current time" 1708 ($time_{current}$) \ along timeline. The measurement "weight empty" 1710 ($wt_{empty}$) indicates the weight of the food container itself when empty. The measurement "weight notification" 1712 ($wt_{notify}$) corresponds to the weight of the container including a level of food which triggers a notification event (see step 3 of the scale initialization described above). Note that $wt_{notify} > wt_{feed}$. The measurement "weight new full" 1740 ($wt_{new\ full}$) corresponds to the weight of the container including food at a replenished full level.

As food is removed from the container over time, a rate of consumption over time 1720 ($m_{remain}$) may be estimated. FIG. 17 visually depicts an estimated rate of consumption with triangle 1722. The rise 1730 of the triangle corresponds to the total amount of food removed between time $t_0$ and time $t_1$. The run 1732 of the triangle comprises the amount of time elapsed between time $t_0$ and time $t_1$. The rise over run estimates a rate of consumption corresponding the to the calculation of $m_{remain}$ set forth above. The times $t_0$ and $t_1$ may correspond to $wt_{current}$ measurements before and after a single removal of food or multiple removals of food. As one example, the times $t_0$ and $t_1$ correspond respectively to the $wt_{full}$ measurement and the most recent $wt_{current}$ measurement.

The estimated rate of consumption may then be used to estimate the period time between current time and occurrence of a notification event, i.e. notification that food fill level equals the notification fill level. The days until notification is estimated as follows:

$$\text{days until notification} = \frac{wt_{current} - wt_{notify}}{m_{remain}}$$

The estimated rate of consumption may also be used to estimate days until the container is empty as follows:

$$\text{days until empty} = \frac{wt_{current} - wt_{empty}}{m_{remain}}$$

Figure 18:
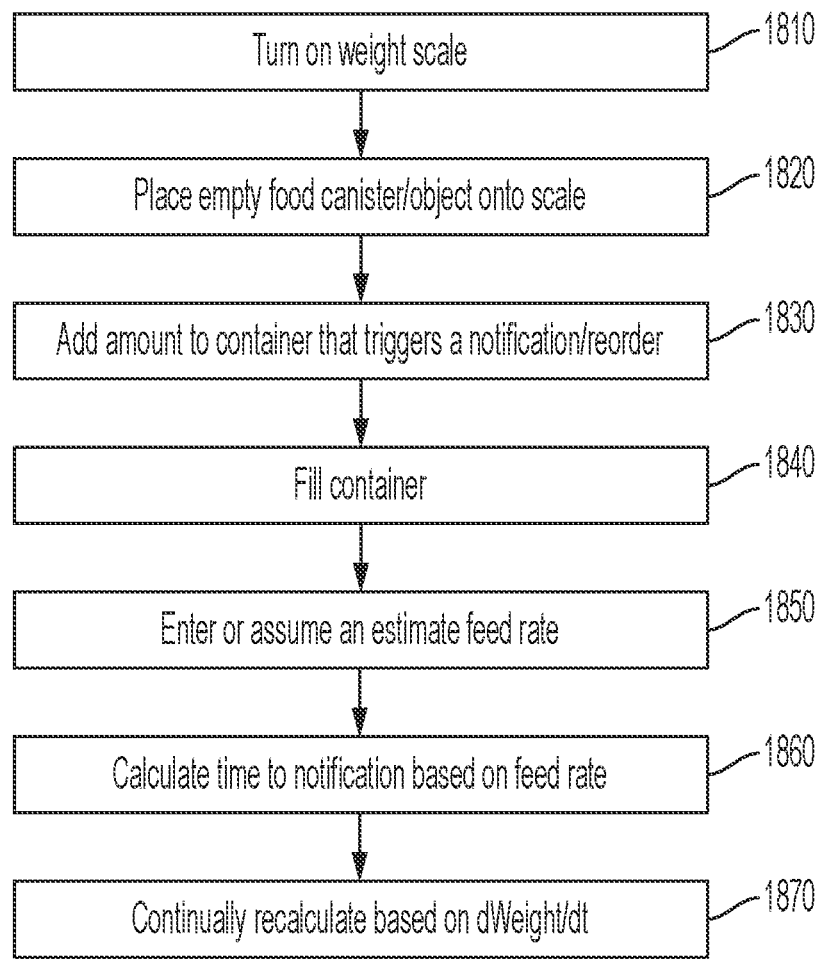
FIG. 18 shows a method for estimating and monitoring rate of consumption, under an embodiment.

FIG. 18 shows a method of initializing a scale for use with a user's food container and estimating a rate of consumption, under an embodiment. The method includes 1810 turning on the weight scale. The method includes 1820 placing an empty food container on the scale. The method includes 1830 adding an amount of food to the container corresponding to a fill level triggering a notification/reorder event. The method includes 1840 filling the container to a maximum or otherwise desired fill level. The method 1850 includes entering an estimated or assumed consumption rate. The method 1860 includes estimating a time to notification based on the estimated/assumed consumption rate. The method 1870 includes continuously recalculating a rate of consumption and time to notification based on observed consumption rate data.

Information derived from the model described above may be used to schedule weight measurements. For example, when the scale is near maximum weight, an estimated rate of consumption may be used to predict the moment the scale will register a threshold "low event" weight. The scale may then be configured to remain dormant for many, many days prolonging battery life. The scale may wake up every 3 days when the container is full to take a weight measurement. As another example, the scale may wake up every 8 hours when half full to take a weight measurement. As the scale determines it is closer to its Tare threshold, it increases its sample frequency to ensure that replenishment occurs on schedule.

Under one embodiment, a proximity sensor may be added to the weight scale. Whenever food is removed from the storage container, the person removing the food is in proximity to the scale. Accordingly, a low-power proximity sensor may be used to detect such presence and trigger a weight measurement. A proximity sensing device may include an infrared sensor, an ultrasonic sensor, a capacitive sensor, and/or other sensing technologies.

Another embodiment of the scale detects mechanical changes in the scale. Accordingly, changes in weight may trigger a weight measurement. Such embodiment ensures a measurement when food has been removed from the storage container. Further, the detected weight change may initiate a time delayed measurement. This approach ensures that the food removal occurs prior to weight measurement.

The processor of a tare scale may compensate for drift in the scale. As weight sits on the scale, typical resistive scales will drift over time resulting in either an overestimate or underestimate in weight. Linear drifts to an analog system may be ignored by an analog to digital converter. According to the calculation methods described, the drift between replenishment does not become a factor until it surpasses the weight of a feeding and the drift becomes insurmountable if it grows larger than the notification weight. Also note that an embodiment of the scale may include sensors that demonstrate minimal drift relative to the weight of the food container and food container including food.

While a removable tare weight scale may use tare weights to establish a baseline refill level, a user may wish to set many notification points. An application running on a smartphone may provide a user with such flexibility. A user may provide inputs to the application in establishing both the auto-replenish weight and an alert weight which simply triggers a notification alert that food is very low. Under such embodiment, the application may eliminate the need for tare weigh buttons on the scale itself.

As described above, a tare scale (serving as a base for a food storage unit), a smartphone, a wireless router, and a pet feeder may cooperate as a food monitoring system to monitor the level of food and provide automated options for replenishing a food supply. Over time, drift may affect load cells of the scale that compute weight. Under one embodiment, a user counteracts the effect of drift through manual intermittent tare calibrations. The user can activate a setup mode option allowing manual estimate of the container's fill level. As one example, the user may tell the device that it is 30% full. This is a rough calculation and rough calibration that may quickly remedy any significant drifts that may occur. Under an embodiment, the food monitoring system may automatically eliminate drift. As described above, the system is aware of ordered food amounts. Therefore, the system may anticipate the amount of food that will be added on top of existing reserves. The system may then anticipate expected weight scale measurements and calibrate the load cells for the next phase of life. This process eliminates a tare process implemented by a user, under one embodiment.

While the use-cases described above are directed to dry food, the pet food monitoring system may be used to monitor fill levels of other foods, e.g., wet, canned food. A user may place a number of cans corresponding to a replenishment threshold on the scale and then implement the Tare button/functionality. The user may then stack the remaining cans on top of the scale. As the cans are consumed, the scale monitors the reduction. Once the weight is below the Tare threshold, the replenishment process begins as already described above. Further, the pet food monitoring system may be alternatively be used to monitor any substance that requires intermittent replacement, e.g. kitty-litter.

Figure 19:
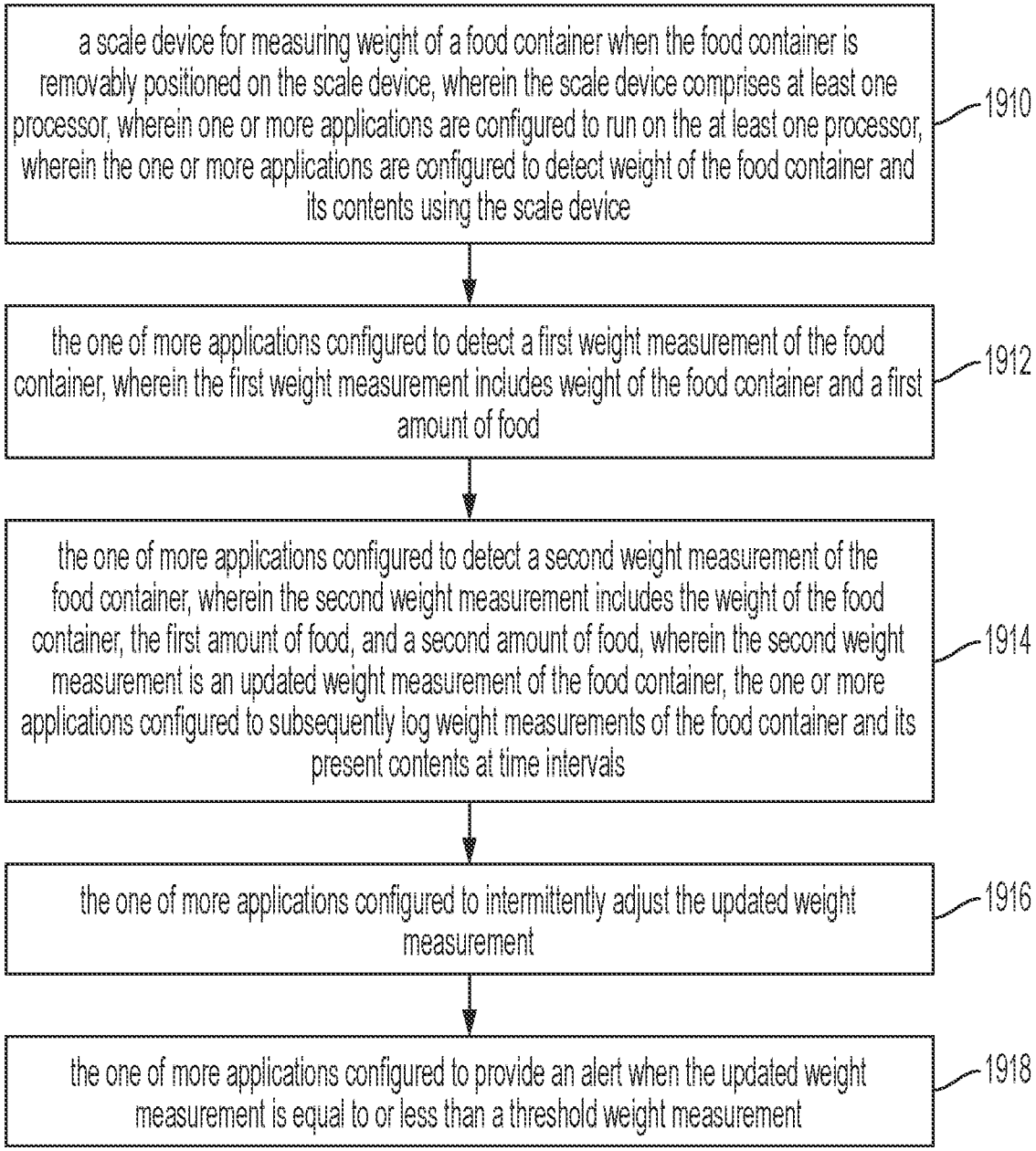
FIG. 19 shows a system for monitoring an amount of food in a food container, under an embodiment.

FIG. 19 shows a system for monitoring an amount of food in a food container, under an embodiment. The system includes 1910 a scale device for measuring weight of a food container when the food container is removably positioned on the scale device, wherein the scale device comprises at least one processor, wherein one or more applications are configured to run on the at least one processor, wherein the one or more applications are configured to detect weight of the food container and its contents using the scale device. The system includes 1912 the one of more applications configured to detect a first weight measurement of the food container, wherein the first weight measurement includes weight of the food container and a first amount of food. The system includes 1914 the one or more applications configured to detect a second weight measurement of the food container, wherein the second weight measurement includes the weight of the food container, the first amount of food, and a second amount of food, wherein the second weight measurement is an updated weight measurement of the food container, the one or more applications configured to subsequently log weight measurements of the food container and its present contents at time intervals. The system includes 1916 the one or more applications configured to intermittently adjust the updated weight measurement. The system includes 1918 the one of more applications configured to provide an alert when the updated weight measurement is equal to or less than a threshold weight measurement.

A system is described herein comprising under an embodiment a scale device for measuring weight of a food container when the food container is removably positioned on the scale device, wherein the scale device comprises at least one processor, wherein one or more applications are configured to run on the at least one processor, wherein the one or more applications are configured to detect weight of the food container and its contents using the scale device. The system includes the one of more applications configured to detect a first weight measurement of the food container, wherein the first weight measurement includes weight of the food container and a first amount of food. The system includes the one of more applications configured to detect a second weight measurement of the food container, wherein the second weight measurement includes the weight of the food container, the first amount of food, and a second amount of food, wherein the second weight measurement is an updated weight measurement of the food container, the one or more applications configured to subsequently log weight measurements of the food container and its present contents at time intervals. The system includes the one of more applications configured to intermittently adjust the updated weight measurement. The system includes the one of more applications configured to provide an alert when the updated weight measurement is equal to or less than a threshold weight measurement.

The threshold weight measurement of an embodiment comprises the first weight measurement.

The adjusting the updated weight measurement comprises subtracting the most recently logged weight measurement from the most recent value of the updated weight measurement, under an embodiment.

The scale device of an embodiment comprises a proximity detector.

The proximity detector of an embodiment comprises at least one of an infrared sensor, an ultrasonic sensor, and a capacitive sensor.

The logging the weight measurements occurs when the proximity detector detects motion of an object in a proximity to the scale device, under an embodiment.

The time intervals of an embodiment comprise fixed time intervals.

The logged weight measurements of an embodiment include a timestamp for each logged weight measurement.

The one or more applications of an embodiment are configured to use the logged weight measurements and corresponding timestamps to estimate a rate by which food is removed from the food container.

The one or more applications of an embodiment are configured to use the rate for predicting a future time when the updated weight measurement is equal to or less than the threshold weight measurement.

The one or more applications of an embodiment are configured to use the rate for scheduling the time intervals of the logged weight measurements.

The scheduling comprises reducing length of the time intervals as present time approaches the predicted future time, under an embodiment.

The alert of an embodiment comprises a visual communication delivered through an electronic interface of the scale device.

The one or more applications of an embodiment are communicatively coupled with a remote application running on a processor of a smartphone.

The alert of an embodiment comprises sending a communication to the remote application, wherein the remote application provides the alert to an electronic display of the smartphone.

The one or more applications of an embodiment are communicatively coupled with at least one application running on a remote server.

The providing the alert includes initiating communication with the at least one application for ordering additional food to replenish the food container, under an embodiment.

A method is described herein that includes under an embodiment measuring weight of a food container and its contents, wherein the measuring comprises detecting a first weight measurement of the food container, wherein the first weight measurement includes weight of the food container and a first amount of food, wherein the measuring comprises detecting a second weight measurement of the food container, wherein the second weight measurement includes the weight of the food container, the first amount of food, and a second amount of food, wherein the second weight measurement is an updated weight measurement of the food container, wherein weight of the food container and its present contents are subsequently logged at time intervals. The method includes intermittently adjusting the updated weight measurement. The method includes providing an alert when the updated weight measurement is equal to or less than a threshold weight measurement.

The threshold weight measurement of an embodiment comprises the first weight measurement.

The adjusting the updated weight measurement comprises subtracting the most recently logged weight measurement from the most recent value of the updated weight measurement, under an embodiment.

The scale device of an embodiment comprises a proximity detector, wherein the proximity detector comprises at least one of an infrared sensor, an ultrasonic sensor, and a capacitive sensor.

The logging the weight measurements occurs when the proximity detector detects motion of an object in a proximity to the scale device, under an embodiment.

The time intervals of an embodiment comprise fixed time intervals.

The logged weight measurements of an embodiment include a timestamp for each logged weight measurement.

The method of an embodiment uses the logged weight measurements and corresponding timestamps to estimate a rate by which food is removed from the container.

The method of an embodiment uses the rate for predicting a future time when the updated weight measurement is equal to or less than the threshold weight measurement.

The method of an embodiment uses the rate for scheduling the time intervals of the logged weight measurements.

The scheduling comprises reducing length of the time intervals as present time approaches the predicted future time, under an embodiment.

The alert of an embodiment comprises a visual communication delivered through an electronic interface of the scale device.

Computer networks suitable for use with the embodiments described herein include local area networks (LAN), wide area networks (WAN), Internet, or other connection services and network variations such as the world wide web, the public internet, a private internet, a private computer network, a public network, a mobile network, a cellular network, a value-added network, and the like. Computing devices coupled or connected to the network may be any micro-processor controlled device that permits access to the network, including terminal devices, such as personal computers, workstations, servers, mini computers, main-frame computers, laptop computers, mobile computers, palm top computers, hand held computers, mobile phones, TV set-top boxes, or combinations thereof. The computer network may include one of more LANs, WANs, Internets, and computers. The computers may serve as servers, clients, or a combination thereof.

The networked weight scale for smart ordering can be a component of a single system, multiple systems, and/or geographically separate systems. The networked weight scale for smart ordering can also be a subcomponent or subsystem of a single system, multiple systems, and/or geographically separate systems. The components of networked weight scale for smart ordering can be coupled to one or more other components (not shown) of a host system or a system coupled to the host system.

One or more components of the networked weight scale for smart ordering and/or a corresponding interface, system or application to which the networked weight scale for smart ordering is coupled or connected includes and/or runs under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

The components of any system that include networked weight scale for smart ordering can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Aspects of the networked weight scale for smart ordering and corresponding systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the networked weight scale for smart ordering and corresponding systems and methods include: microcontrollers with memory (such as electronically erasable programmable read only memory (EEPROM)), embedded microprocessors, firmware, software, etc. Furthermore, aspects of the networked weight scale for smart ordering and corresponding systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the networked weight scale for smart ordering is not intended to be exhaustive or to limit the systems and methods to the precise forms disclosed. While specific embodiments of, and examples for, the networked weight scale for smart ordering and corresponding systems and methods are described herein for illustrative purposes, various equivalent modifications are possible within the scope of the systems and methods, as those skilled in the relevant art will recognize. The teachings of the networked weight scale for smart ordering and corresponding systems and methods provided herein can be applied to other systems and methods, not only for the systems and methods described above.

The elements and acts of the various embodiments described above can be combined to provide further embodiments. These and other changes can be made to the networked weight scale for smart ordering and corresponding systems and methods in light of the above detailed description.

What is claimed is:

1. A system, comprising,
    a scale device for measuring weight of a food container when the food container is removably positioned on the scale device, wherein the scale device comprises at least one processor, wherein one or more applications are configured to run on the at least one processor, wherein the one or more applications are configured to detect weight of the food container and its contents using the scale device;
    the one of more applications configured to detect a first weight measurement of the food container, wherein the first weight measurement includes weight of the food container and a first amount of food to establish a threshold weight measurement;
    the one of more applications configured to detect a second weight measurement of the food container, wherein the second weight measurement includes the weight of the food container, the first amount of food, and a second amount of food, wherein the second weight measurement is an updated weight measurement of the food container, the one or more applications configured to subsequently log weight measurements of the food container and its present contents at time intervals;
    the one of more applications configured to intermittently adjust the updated weight measurement; and
    the one of more applications configured to provide an alert when the updated weight measurement is equal to or less than the threshold weight measurement.

2. The system of claim 1, wherein the threshold weight measurement comprises the first weight measurement.

3. The system of claim 1, wherein the adjusting the updated weight measurement comprises subtracting the most recently logged weight measurement from the most recent value of the updated weight measurement.

4. The system of claim 1, wherein the scale device comprises a proximity detector.

5. The system of claim 4, wherein the proximity detector comprises at least one of an infrared sensor, an ultrasonic sensor, and a capacitive sensor.

6. The system of claim 5, wherein the logging the weight measurements occurs when the proximity detector detects motion of an object in a proximity to the scale device.

7. The system of claim 1, wherein the time intervals comprise fixed time intervals.

8. The system of claim 1, wherein the logged weight measurements include a timestamp for each logged weight measurement.

9. The system of claim 8, the one or more applications configured to use the logged weight measurements and corresponding timestamps to estimate a rate by which food is removed from the food container.

10. The system of claim 9, the one or more applications configured to use the rate for predicting a future time when the updated weight measurement is equal to or less than the threshold weight measurement.

11. The system of claim 10, the one or more applications configured to use the rate for scheduling the time intervals of the logged weight measurements.

12. The system of claim 11, wherein the scheduling comprises reducing length of the time intervals as present time approaches the predicted future time.

13. The system of claim 1, wherein the alert comprises a visual communication delivered through an electronic interface of the scale device.

14. The system of claim 1, wherein the one or more applications are communicatively coupled with a remote application running on a processor of a smartphone.

15. The system of claim 14, wherein the alert comprises sending a communication to the remote application, wherein the remote application provides the alert to an electronic display of the smartphone.

16. The system of claim 1, wherein the one or more applications are communicatively coupled with at least one application running on a remote server.

17. The system of claim 16, wherein the providing the alert includes initiating communication with the at least one application for ordering additional food to replenish the food container.

18. A method, comprising,
    measuring weight of a food container and its contents, wherein the measuring comprises detecting a first weight measurement of the food container, wherein the first weight measurement includes weight of the food container and a first amount of food to establish a threshold weight measurement, wherein the measuring comprises detecting a second weight measurement of the food container, wherein the second weight measurement includes the weight of the food container, the first amount of food, and a second amount of food, wherein the second weight measurement is an updated weight measurement of the food container, wherein weight of the food container and its present contents are subsequently logged at time intervals;
    intermittently adjusting the updated weight measurement; and
    providing an alert when the updated weight measurement is equal to or less than the threshold weight measurement.

19. The method of claim 18, wherein the threshold weight measurement comprises the first weight measurement.

20. The method of claim 18, wherein the adjusting the updated weight measurement comprises subtracting the most recently logged weight measurement from the most recent value of the updated weight measurement.

21. The method of claim 18, wherein the scale device comprises a proximity detector, wherein the proximity detector comprises at least one of an infrared sensor, an ultrasonic sensor, and a capacitive sensor.

22. The method of claim 21, wherein the logging the weight measurements occurs when the proximity detector detects motion of an object in a proximity to the scale device.

23. The method of claim 18, wherein the time intervals comprise fixed time intervals.

24. The method of claim 18, wherein the logged weight measurements include a timestamp for each logged weight measurement.

25. The method of claim 24, comprising using the logged weight measurements and corresponding timestamps to estimate a rate by which food is removed from the container.

26. The method of claim 25, comprising using the rate for predicting a future time when the updated weight measurement is equal to or less than the threshold weight measurement.

27. The method of claim 26, comprising using the rate for scheduling the time intervals of the logged weight measurements.

28. The method of claim 27, wherein the scheduling comprises reducing length of the time intervals as present time approaches the predicted future time.

29. The method of claim 18, wherein the alert comprises a visual communication delivered through an electronic interface of the scale device.

\* \* \* \* \*